US009329832B2

(12) United States Patent
Blaisch

(10) Patent No.: US 9,329,832 B2
(45) Date of Patent: May 3, 2016

(54) VOICE INTERNET SYSTEM AND METHOD

(76) Inventor: Robert Allen Blaisch, Los Angeles, CA (US)

( * ) Notice: Subject to any disclaimer, the term of this patent is extended or adjusted under 35 U.S.C. 154(b) by 67 days.

(21) Appl. No.: 13/467,013

(22) Filed: May 8, 2012

(65) Prior Publication Data

US 2015/0134340 A1 May 14, 2015

Related U.S. Application Data

(60) Provisional application No. 61/484,205, filed on May 9, 2011, provisional application No. 61/508,639, filed on Jul. 16, 2011.

(51) Int. Cl.
*G10L 21/00* (2013.01)
*G10L 25/00* (2013.01)
*G10L 15/00* (2013.01)
*G06F 3/16* (2006.01)
*G06F 3/0484* (2013.01)
*G06F 17/30* (2006.01)
*H04M 3/493* (2006.01)

(52) U.S. Cl.
CPC ............ *G06F 3/167* (2013.01); *G06F 3/04842* (2013.01); *G06F 17/3089* (2013.01); *G06F 17/30861* (2013.01); *H04M 3/493* (2013.01); *G10L 15/00* (2013.01)

(58) Field of Classification Search
CPC ......... G10L 15/26; G10L 17/22; G10L 15/22; G10L 15/00; G10L 15/30; G06F 3/167; G06F 3/01; G06F 3/0482; G06F 3/0416; G06F 3/04817; B66B 1/3415; H04L 41/22; H04M 2201/40; H04M 2250/74; A61B 5/749
USPC ............... 704/270, 270.1, 275, 277, 235, 246
See application file for complete search history.

(56) References Cited

U.S. PATENT DOCUMENTS

| | | | | |
|---|---|---|---|---|
| 7,263,177 B1 * | 8/2007 | Paterik | .................. | H04M 3/493 370/353 |
| 7,460,652 B2 * | 12/2008 | Chang | .................. | H04M 3/493 379/212.01 |
| 7,472,166 B1 * | 12/2008 | Davis | .................... | G06F 9/4446 709/217 |
| 7,603,433 B1 * | 10/2009 | Paterik | .................. | H04M 3/493 370/352 |
| 7,769,705 B1 * | 8/2010 | Luechtefeld | ........... | G06Q 10/06 706/47 |
| 8,639,214 B1 * | 1/2014 | Fujisaki | ................. | G06Q 20/32 379/88.03 |
| 8,676,273 B1 * | 3/2014 | Fujisaki | .............. | H04M 1/6505 379/142.06 |
| 8,838,454 B1 * | 9/2014 | Thenthiruperai | ....... | G10L 15/22 704/231 |
| 2002/0059378 A1 * | 5/2002 | Mustafa | .................. | H04L 29/06 709/205 |
| 2003/0007609 A1 * | 1/2003 | Yuen | .................... | H04M 3/4938 379/88.16 |
| 2003/0144846 A1 * | 7/2003 | Denenberg | .................... | 704/277 |
| 2004/0120473 A1 * | 6/2004 | Birch | .................. | H04M 3/4938 379/88.17 |
| 2004/0172254 A1 * | 9/2004 | Sharma | .................. | A61K 8/411 704/270.1 |
| 2005/0033582 A1 * | 2/2005 | Gadd | ..................... | G06Q 30/02 704/277 |
| 2005/0043952 A1 * | 2/2005 | Sharma | .............. | H04M 3/4938 704/270.1 |
| 2005/0074113 A1 * | 4/2005 | Mathew | ................. | G06Q 10/06 379/265.02 |
| 2005/0137874 A1 * | 6/2005 | Da Palma | ................. | G06F 8/31 704/270.1 |
| 2005/0192809 A1 * | 9/2005 | Dodrill | ................... | H04L 67/34 704/270.1 |
| 2007/0027692 A1 * | 2/2007 | Sharma | .................. | A61K 8/411 704/270.1 |
| 2009/0210795 A1 * | 8/2009 | Katsuranis | ............. | G06F 3/011 715/728 |
| 2009/0285392 A1 * | 11/2009 | Leitheiser | ............. | G06Q 30/02 380/255 |
| 2012/0271640 A1 * | 10/2012 | Basir | ................. | H04M 1/72552 704/275 |

* cited by examiner

*Primary Examiner* — Edgar Guerra-Erazo

(74) *Attorney, Agent, or Firm* — Fish & Tsang LLP

(57) ABSTRACT

A system and method is provided for voice activated Web based infrastructure (Voice Portal) which accepts spoken input from a variety of devices, including desktop and laptop computers, tablets, smart phones, standard mobile phones, and ordinary hard-wired telephones.

12 Claims, 40 Drawing Sheets

| CallWords 800-555-5555 | Home | National CallWords | Local CallWords | CallWords Accessories | Plans and Pricing |

National CallWords

Search for a national CallWord  |  Enter business name or keyword  |  Search

Local CallWords

Search for a Local CallWord  |  Select City and State

Enter business name or keyword  |  Search

Category CallWords  |  Select Categroy

Legal ▼

Enter business name or keyword  |  Search

FIG. 5

| Item Description | | Options | Price |
|---|---|---|---|
| CallWord – National National Callword Selections | | Remove | $100.00 |
| | | *Cart Total | $100.00 |
| | | Continue Shopping | Check Out |

FIG. 6

| CallWord | Type | Target | Status | |
|---|---|---|---|---|
| National Callword Selections | Naional | No Target | Inactive | Delete |

FIG. 7

Callword Settings
Bold fields are required

Directory: National
    Callword: National CallWord Selections

Confirmation: None

Edit   Remove

**\*Status:** Inactive

**\*Target Type:** Connection

**\*Target:** Select a Connection

Cancel   Update

| CallPointers | CallWords | Call-Links |

Callword Settings
Bold fields are required

Directory: National
Callword: National CallWord Selections

Confirmation: None

Edit   Remove

**\*Status:** Active

**\*Target Type:** Application

**\*Target:** Cheap Video

Cancel   Update

FIG. 13B

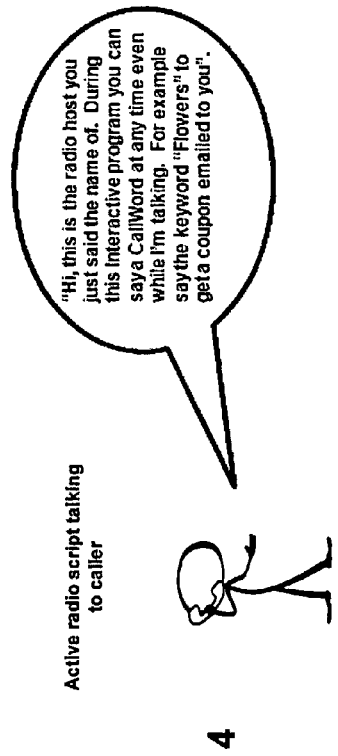

Active radio script talking to caller

"Hi, this is the radio host you just said the name of. During this Interactive program you can say a CallWord at any time even while I'm talking. For example say the keyword "Flowers" to get a coupon emailed to you".

Summary

Active Radio
Prompts caller to say CallWords to Perform actions such as switching
To other system Voice States, Conntct calls,
Email documents, charges a credit card to make a purchase or sends call to Virtual Call Center.

Caller requests transfer to other system state

"OK, I'm taking you to the Travel department. Please say, Airlines, Hotels or rental Cars". Any revenue generated from "Subsequent System" states are tracked back to "Primary System" States.

Caller requests an immediate purchase of goods or services

"OK, I will let you buy this item with a voice command and set up a paperless redemption for you. I will charge the credit card ending in xxxx for 25$ to purchase 50$ of value from Barney's restaurant. Say Purchase this item to confirm".

Caller requests transfer to merchant

"OK, I'll connect your call to the advertiser and Introduce you as my caller".

System places call and plays Introduction after the advertiser answers the pohne.

Caller gets an Immediate callback to confirm purchase

System will Immediately re-call account holder and prompt a request for security method to confirm the transaction. E.G. PIN number / Biometric.

A paperless redemption method using the same caller ID is also presented.

Caller requests emailed doucment or coupon link

"OK, Ill send you the Information or coupon you requested".
If caller ID is registered, system will send requested email. If no caller ID, system will attempt to capture users Information.

Caller requests live assistance

"I'll transfer you to an agent who can help you".

System transfers call to Virtual Call Center to gather data or will send caller data screen pop up to agent.

FIG.19 (A)

1. Viewer initiates a Voice Internet Curated Browsing Session by clicking on a Lunch link

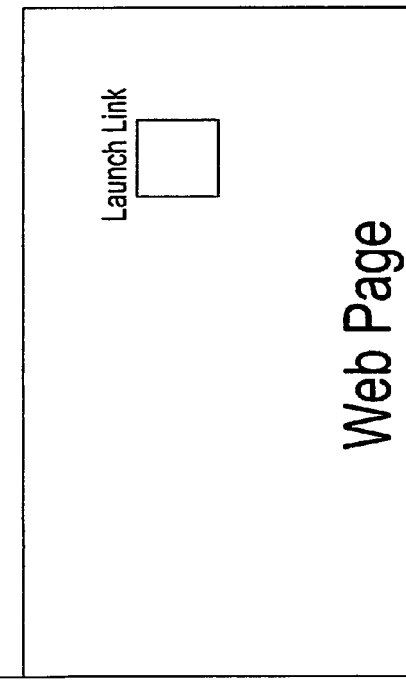

2. The users click launches an interstitial host browsing component compromising of an interactive video player and a navigation panel that prompts the user of available selections to click on or say

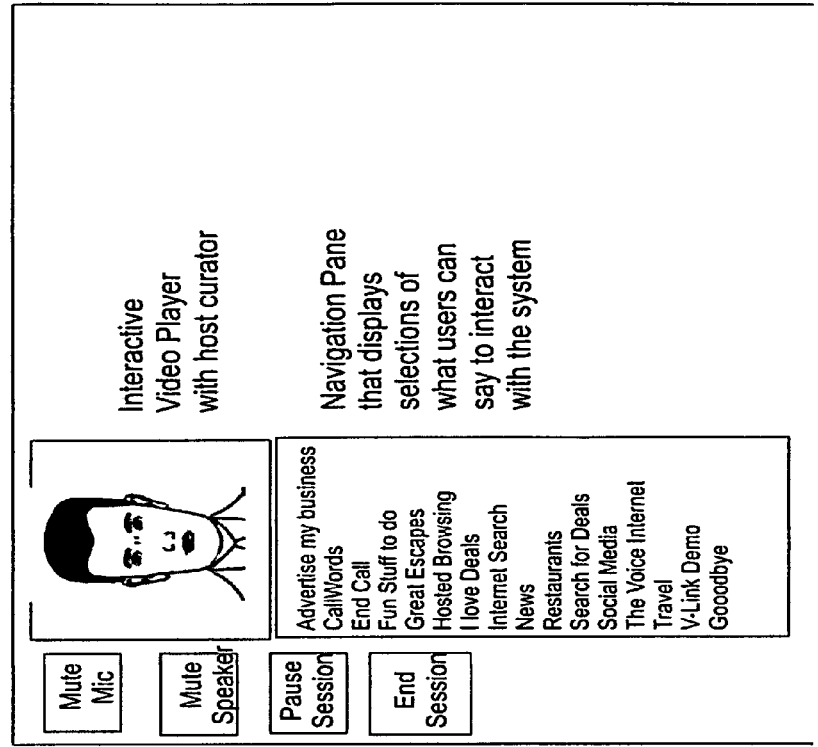

Interactive Video Player with host curator

Navigation Pane that displays selections of what users can say to interact with the system Mute Mic
Mute Speaker
Pause Session
End Session Advertise my business
CallWords
End Call
Fun Stuff to do
Great Escapes
Hosted Browsing
I love Deals
Internet Search
News
Restaurants
Search for Deals
Social Media
The Voice Internet
Travel
V-Link Demo
Gooodbye

FIG.19(B)

3. As the user speaks a selection into their computer microphone, mobile device, phone handset, or clicks on a selection, the system responds by pushing a new URL into their browser in the base web page 4. As each page is displayed the user interface layer (interstitial browser) retrieves a new audio or video component from the cloud using URL's and displays a new user interface prompt. Simultaneously the navigation component is also refreshed and displays the new list of selections that the user can speak or click on to advance to the next child web page

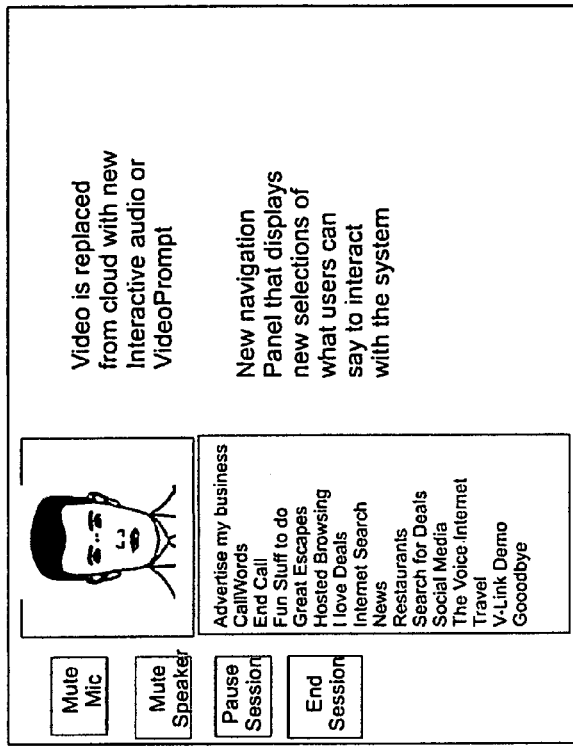

Base Web Page
(parent page)

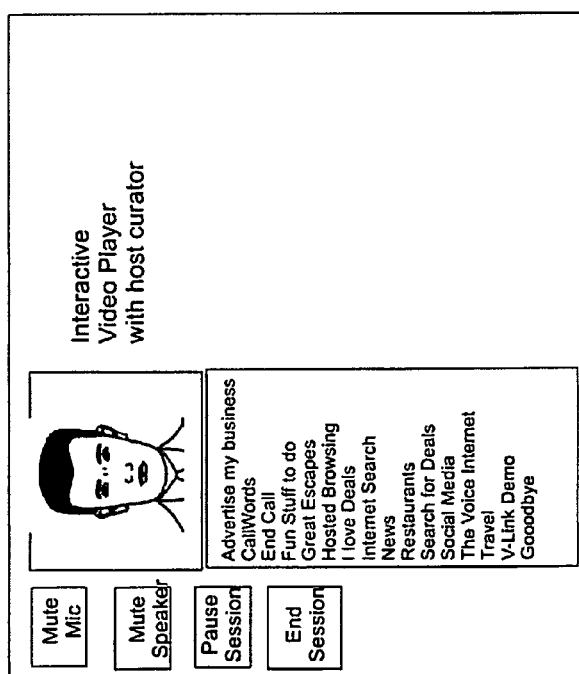

New Web Page
(child page)

FIG. 22(B)
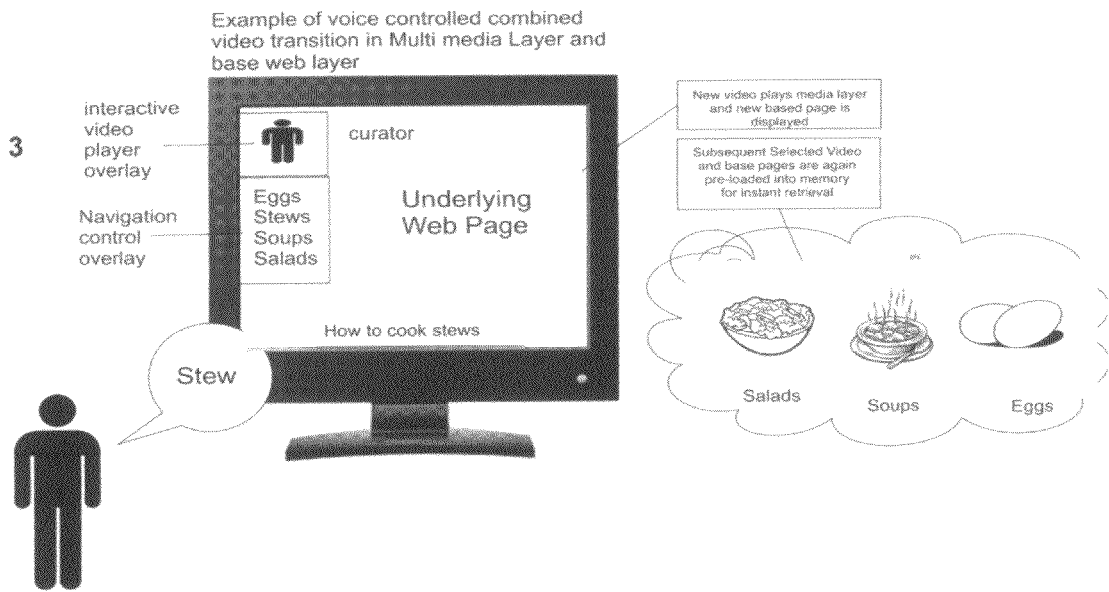
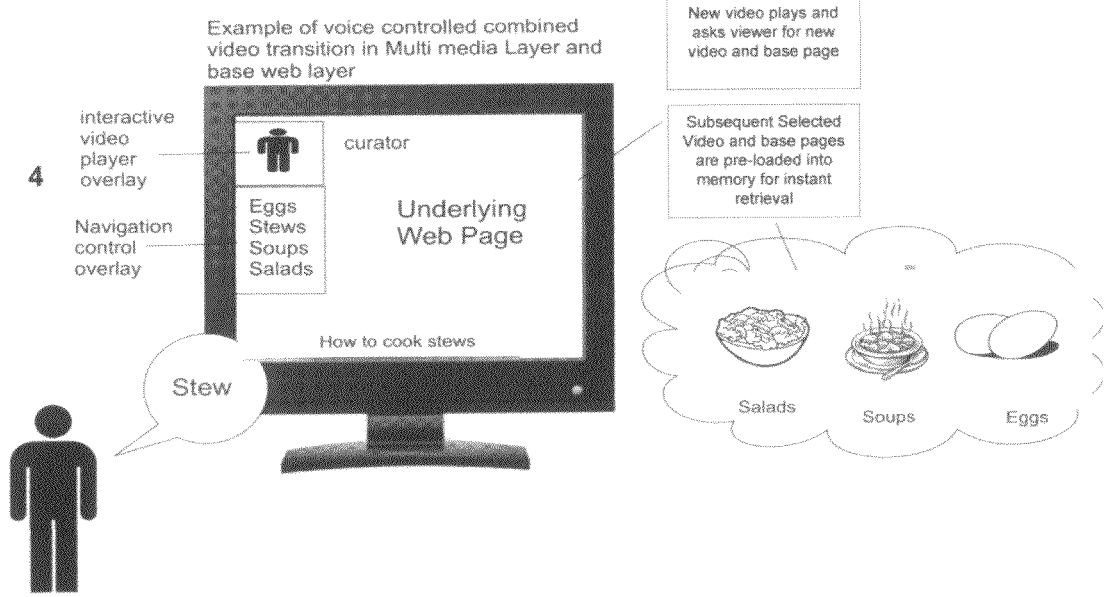

FIG. 28(A)

| | |
|---|---|
| Call Screening<br><br>• Screens and routes your incoming calls.<br>• Screening options can be configured on the phone or on the web in real-time.<br>• Multiple screening modes: Accept Calls, Screen Calls, Do Not Disturb<br>• Allows you to easily accept calls, send callers to voice-mail or send any number of pre-recorded Auto-Responses to callers without speaking to them. | 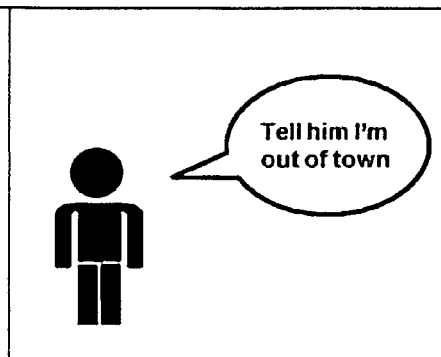 "Tell him I'm out of town" |
| Hands-Free Dialing<br><br>• Voice-activated dialing - Just say "Call" and the name of a contact in your Address Book, or speak the number you would like to dial.<br>• Works with any phone, any time, anywhere.<br>• Repeat calling. No need to hang up, just press "**" to start a new call.<br>• Easy 3-way conferencing.<br>• Voice Internet services available during calls - Just press "##". | "Call Tom at Jones Brokerage" 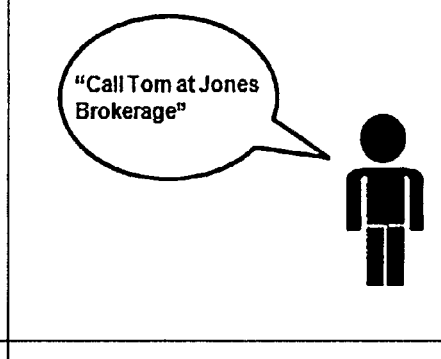 |
| Enhanced Voicemail<br><br>• Multiple Voicemail Greetings.<br>• Retrieve messages on the phone or online.<br>• Callback number captured from Caller ID or caller's spoken phone number.<br>• Auto Callback - Just say: "Return call" while listening to a voicemail message to be connected to the caller.<br>• Voice-activated Navigation - Just say: "First", "Last", "Next Message", etc...<br>• Receive email alerts when new messages arrive. |  "return the call" |
| Voice E-mail<br><br>• Send audio e-mails using your phone.<br>• Record a message or a phone conversation and send it to any contact in your Address Book.<br>• Just say: "Voice E-mail", record your message and select a contact to send to.<br>• A great way to leave a message without making a call. | "Voice E-mail" 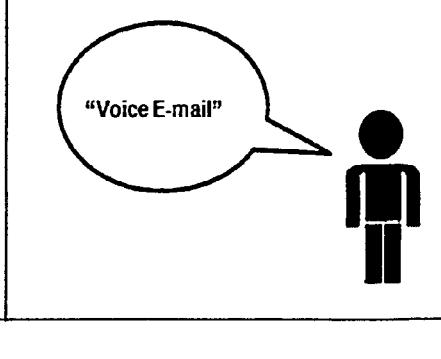 |

FIG. 28(B)

| | |
|---|---|
| E-mail w/File Attachments<br><br>• Send files from your File Store to any contact in your Address Book.<br>• Just say a file name and the contact name you would like to send the file to.<br>• Files are instantly sent to the contact's e-mail address.<br>• Upload and store unlimited files for easy access while you're on the go.<br>• Supports HTML documents for sending formatted e-mails during phone calls. | "Send contract to Jason Smith" |
| Record/Play Audio<br><br>• Record up to 1 hour of audio.<br>• Assigns voice labels to all of your recordings for instant retrieval.<br>• Recordings are stored in the File Store for easy access.<br>• Just say "Play" and the name of a file for instant playback.<br>• Store as many recordings as you want for as long as you want.<br>• Record and Play works during phone conversations or with speakerphones.<br>• Great for presentations, sales training, memos, testimonials or documenting call content. | "Play message from CEO" |
| Address Book<br><br>• Store information for an unlimited number of contacts.<br>• Contact information can be used throughout your calls.<br>  Example: "Call John Doe at Home" or "Send Press Release to John Doe."<br>• Synchronize all your contact info from Outlook with one click using the Microsoft Office® Add-In. | "Call Ken on his cell.." |
| File Store<br><br>• Upload and store unlimited files for easy access throughout your calls.<br>• Use the Microsoft Office® Add-In to upload files directly from Office applications including Word, Excel and more. | "Send proposal" |

VOICE INTERNET SYSTEM AND METHOD

CLAIM OF PRIORITY

A claim of priority is made to the following U.S. Provisional Applications: No. 61/484,205 entitled "SYSTEM AND METHOD FOR THE VOICE INTERNET (TVI)" filed May 9, 2011, and assigned to the assignee hereof and hereby expressly incorporated by reference herein, and 61/508,639 entitled "SYSTEM AND METHOD FOR THE VOICE INTERNET (TVI)" filed Jul. 17, 2011, and assigned to the assignee hereof and hereby expressly incorporated by reference herein.

BACKGROUND

1. Field

The present disclosure generally relates to voice activated Web based infrastructure (Speech Portal) which accepts spoken input from a variety of devices, including desktop and laptop computers, tablets, smart phones, standard mobile phones, and ordinary hard-wired telephones.

2. Description of Related Art

Web browsing is a term used to define a method of user navigation through a series of internet based content. The content may take the form of still images, moving images, video or audio to name a few. Web browsing typically is accomplished by a user through a manual process of pointing a cursor from a computer "mouse" and clicking on a graphical user element. The user may also tap a screen to browse. The result of clicking or tapping an element is for a web page to be rendered on a display to the user, such as a still image, moving image, video or audio.

Voice recognition is a term used to define a method of controlling a computer by use of an audio signal, namely human speech. A voice recognizer records digital samples of the speech signal, processes the digital samples, and maps the characteristics of the processed digital samples to a known template is mapped to an event or action. For example, a voice recognizer may translate the word "call" into a transmission on a cellular phone. The word "call" can be defined as a CallWord.

Before domain names, there were only IP addresses. And before CallWords there were only phone numbers. A CallWord performs similar functionality as a domain name. It makes it easier for users to remember how to place a call or initiate computer actions. The caller only needs to speak the CallWord of the person or business they want to get connected instead of having to remember, look up or dial a phone number. Acquiring a CallWord is similar to acquiring an internet domain name. The registrant visits a registration portal, searches to see if the CallWord they want is available and if it is, completes the registration by paying a fee. Then the registrant may login and access a website to configure the CallWords.

Web browsing may be accomplished through use of a voice recognition front-end processor. A series of web pages may be navigated by using speech instead of clicking or tapping a graphical user element. The navigation is limited by the stored templates.

There exists a need for a speech based navigation scheme to be dynamic such that a first user may create a custom template or "CallWord" which can be subsequently used by other users to navigate a series of web pages.

There also exists a need for an interactive rendering of images, moving images, video, or audio based on a speech based navigation scheme wherein a user may be asked to speak a CallWord based on a specific web page.

There also exists a need to allow our users to navigate pages that are enabled by content providers with a unique visual interface that eliminates confusion with recovery prompts by allowing them to see in a visual manner what all their choices are at every level.

SUMMARY

Embodiments disclosed herein address the above stated needs by using a voice activated Web based infrastructure that accepts spoken input from a variety of devices.

In one embodiment, a method of directing an internet browsing session comprises activating a first web page by a user, establishing an audio overlay control channel, rendering a user interaction control layer, rendering a first host audio content based on the first active web page, activating a second web page by a user based selection of an action in the user interaction control layer, and rendering a second host audio content based on the second activated web page.

In another embodiment, a method of establishing an internet based connection comprises activating a first web page by a user, rendering a first multimedia content based on the first activated web page, rendering a first host command list based on the first activated web page, activating a second web page by a recognized speech utterance, wherein the recognized speech utterance is based on the first host command list, and rendering a second multimedia content based on the second activated web page.

BRIEF DESCRIPTION OF THE DRAWINGS

The aspects and the attendant advantages of the embodiments described herein will become more readily apparent by reference to the following detailed description when taken in conjunction with the accompanying drawings wherein:

FIG. 4A is a diagram of an embodiment of a National type of Call Word.

FIG. 4B is a diagram of an embodiment of a Local type of Call Word.

FIG. 4C is a diagram of a CallWord category.

FIG. 5 is a diagram of an embodiment of a CallWord cart check-out.

FIG. 6 is a diagram of an embodiment of a CallWord user account.

FIG. 7 is a diagram of an embodiment of a CallWord pointed to a phone number.

FIG. 19(A) is a diagram of an embodiment of a host guided browsing session.

FIG. 19(B) is a diagram of an embodiment of a host guided browsing session.

FIG. 22(B) is a diagram of an embodiment of an interactive session with a user.

FIG. 28A is a diagram of an embodiment of CommandWords capabilities.

FIG. 28(B) is a diagram of another embodiment of CommandWords capabilities.

DETAILED DESCRIPTION

Voice Internet—Voice Activated Web System

The Voice Internet is a system and method is that is comprised of an integrated suite of telephonic, internet, financial and speech-activated applications which marry the ubiquity of voice driven communications with the distribution and interactive capabilities of the Internet.

The infrastructure and user tools provide end users with a new, integrated voice and visual experience while accessing the Internet, creating a de facto hybrid, unified media blending content delivery over Internet Protocol (IP), telephony (both traditional and Voice Over Internet Protocol—VoIP), and even terrestrial and satellite radio. These interactive voice controls include interactive recorded prompts, grammars and voice activated Web Page states.

The purpose behind TVI is to introduce an alternative user experience to Internet browsing and navigation, leveraging voice-driven commands and speech prompts in lieu of mouse clicks, touch screens or other forms of interface devices and methods. All of the technology can be accessed via landlines or mobile phones, mobile applications on smart phones and tablets, and with VoIP clients from an Internet connected computer equipped with a microphone (either built-in or external) and speakers.

The system is essentially a collection of interlinked menus and speech driven technology applications that were designed to be ultimately configured by the systems users using SAAS web configuration tools.

The system is departmentalized as follows in this document
  Main Portal
    Telephony
    Web
    VoIP Client
    Smart Phone Applications
  CallWords
    National
    Local
    Category/Market Search
    Fetch
  Speech Applications
    Voice Front
    Voice QA
    CommandWords
  Web Actions
    Host Guided Browsing
    Page Fetch/Push
    Email Initiation of Object Voice Internet Services can be accessed through a series of voice portals by dialing into it including the use of 800-555-5555, or by accessing with a smart phone application or by visiting a web portal that is supported by a Voice Internet VoIP client.

Figure 1:
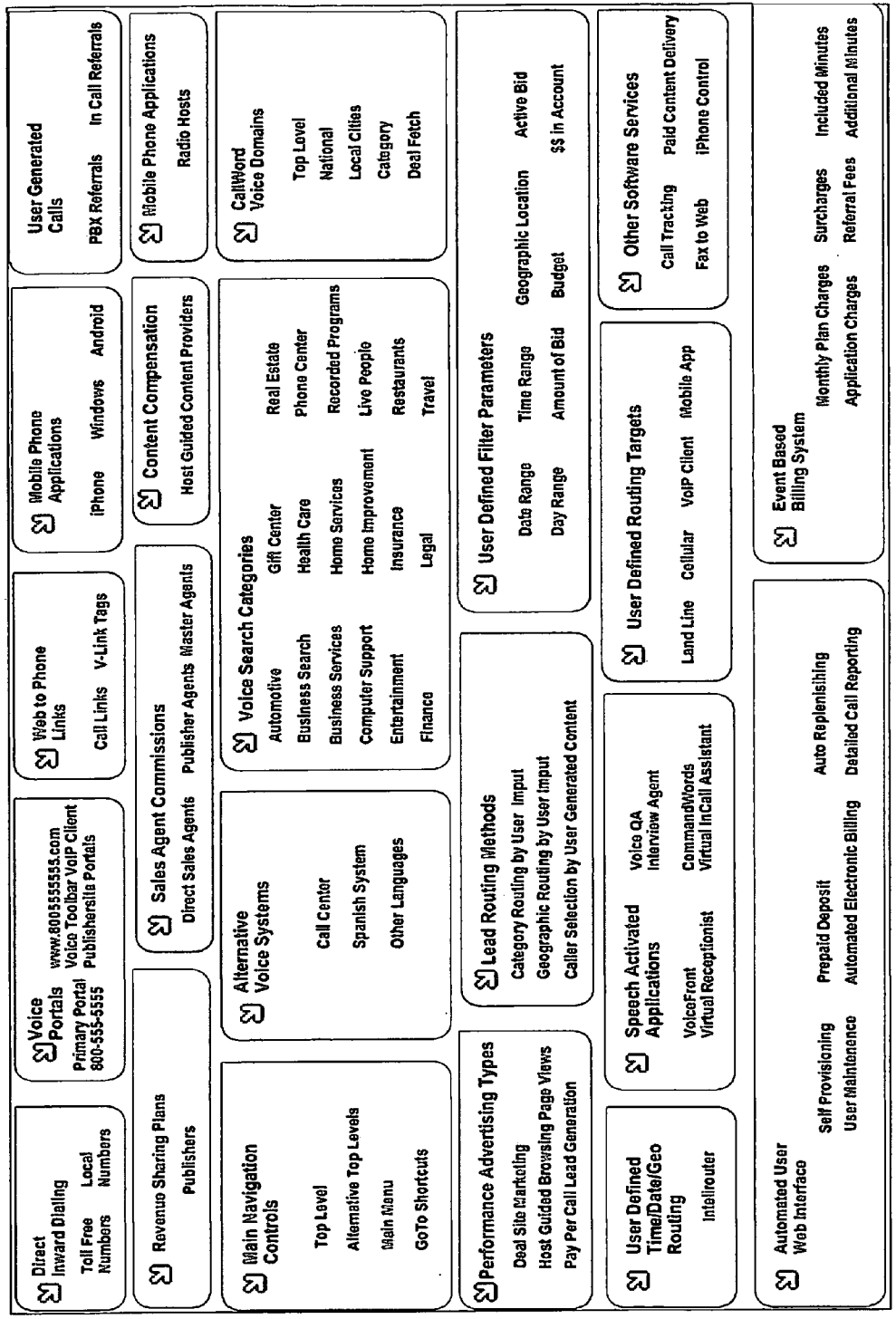
FIG. 1 is a diagram of an embodiment of a top level perspective view of the voice internet system.

Voice Internet's system is comprised of the following components:
1) A Voice Portal
2) VoIP Client
3) Voice Browser Multi Layered Web Client
  a. Base Layer Web Page Display (iframe)
  b. User Interface Layer—
  c. Voice Control Layer—Open audio channel
  d. Multi Media Layer
4) VoIP Switch and proprietary switching software
5) TDM Telephony Switch and proprietary switching software
6) Internet Router
7) Web Server
8) Email Server
9) A Speech Server Assembly Farm
  a. Grammar Generation Engine
  b. Speech Mark Up Code c. Speech Engine
d. Dynamic Prompt Server
10) IIS Web Server Farm
11) SQL Database Farm The system was designed to provide a network of interlinked entry points, exit points, routing applications, automated actions and monetization processes that form a contained financial and communications ecosystem. Voice Internet participants can financially benefit by use of our system. FIG. 1 offers a top level perspective view of the system.

CallWords—Speech DNS Registrar

Figure 2:
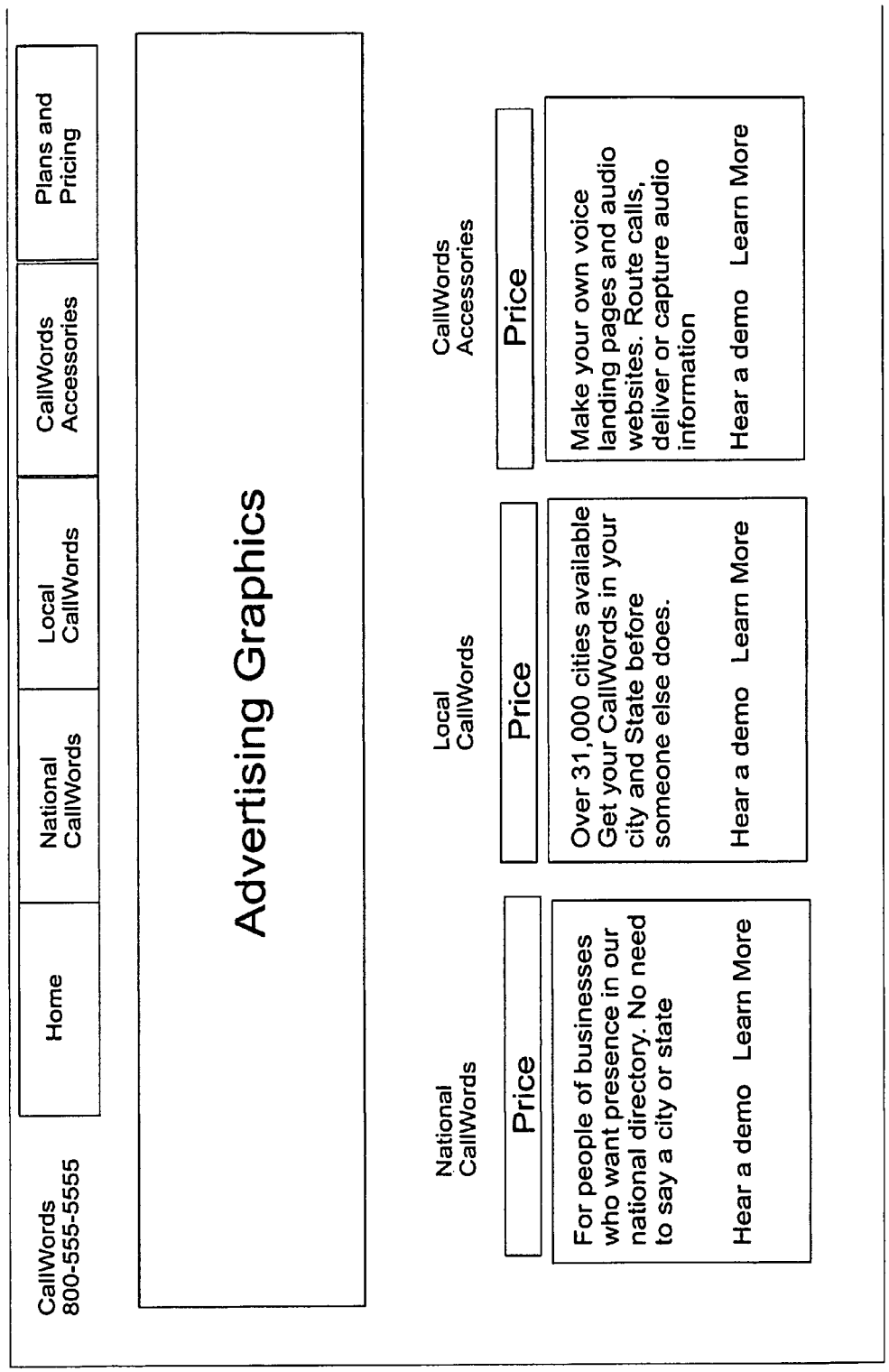
FIG. 2 is a diagram of an embodiment of an Internet based portal display of a CallWords product.

CallWords are the main control mechanism and navigation points of the Voice Internet system. They are essentially a unique, user designated "keyword," short phrase or Voice Internet domain name, registered by a user/advertiser (individual or business entity) that is spoken by a caller to trigger a specific event in TVI's online speech portal. CallWords are available both on a "first come, first serve" basis as well as on a local, regional and national level to enable TVI to monetize the use of specific keywords or phrases through different advertisers if they do not elect to bid for exclusive use of a word on a national level. Once a keyword, short phrase or Voice Internet domain name is set up, a caller simply places a phone call to a designated number (which may be either a local call or a toll-free call, depending on what the advertising party has chosen) and is connected to a voice activated utility application. Depending on what action the CallWord is designed to trigger, the end user may have the option of: requesting that a paperless coupon be emailed; being connected to a designated phone number provided by the advertiser; being forwarded to an automated survey; or virtually any other automated or human-driven interaction that the advertiser might want. Users with Web access utilizing CallWords can even initiate a Web page transfer in which the advertiser's Website or other designated Internet domain loads automatically within the framework of the Voice Internet portal, thus requiring no additional input from the user aside from voice commands. FIG. 2 shows an exemplary embodiment of an Internet based portal display of a CallWords product.

Figure 3:
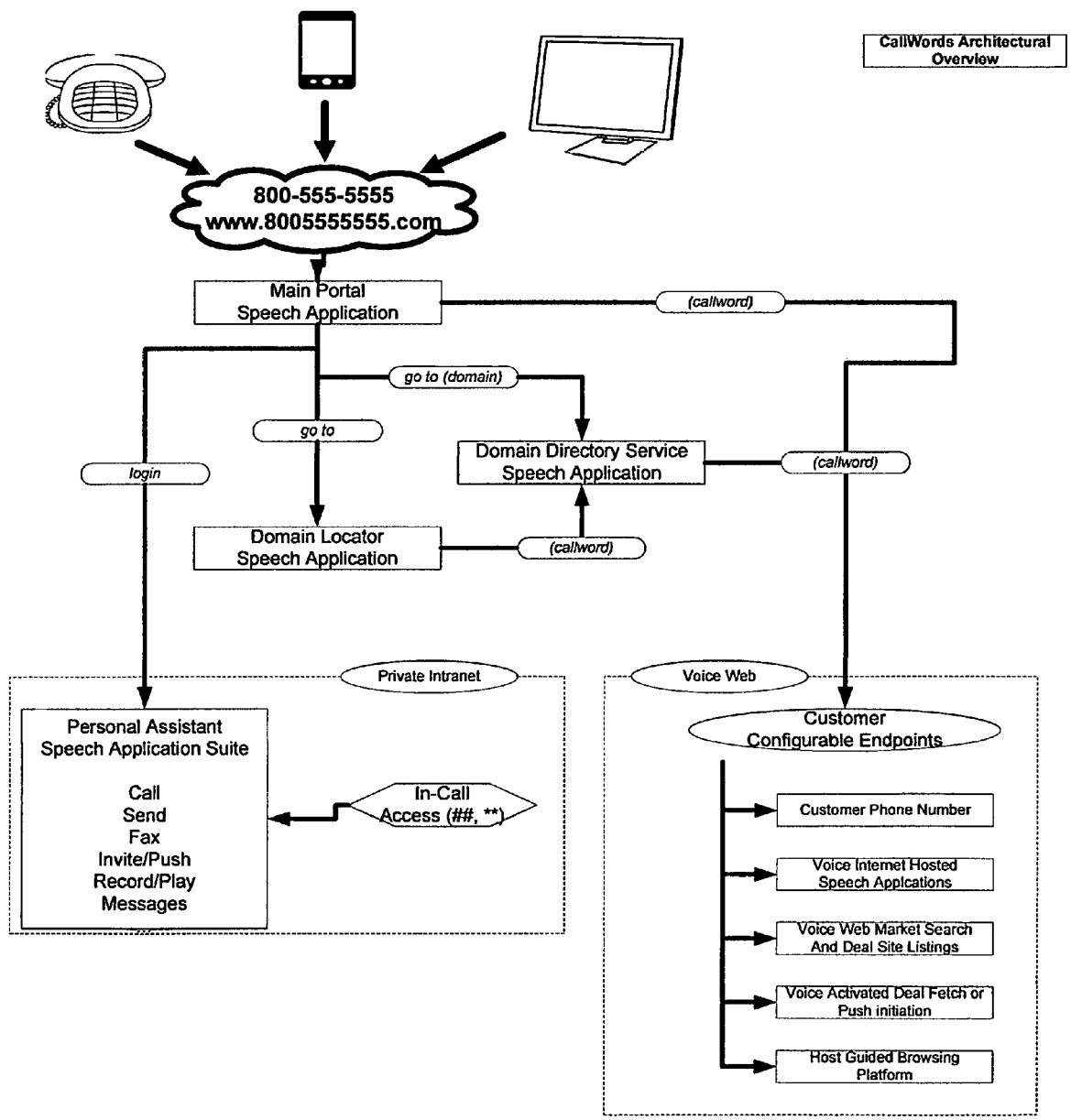
FIG. 3 is a diagram of an embodiment of an architecture overview of a CallWord interaction in the Voice Internet.

FIG. 3 show an architecture overview of a CallWord interaction in the Voice Internet. Following the model of the Internet, CallWords allow users to exclusively register the use of words or phrases that are enabled throughout the system. This word or phrase is called a CallWord and can be pointed to a telephone number, another speech application which is hosted by Voice Internet or it can be used to invoke web actions while navigating through the Voice Internet Portal.

The CallWord can be either registered as a primary top-level primary listing, or as a sub-domain CallWord. When a caller enters the CallWords portal and speaks the CallWord registered by the user, the system automatically makes the connection, transfers to a hosted speech application or invokes an action, eliminating the need for the user to know, look up or remember telephone numbers or other access computer access points.

CallWords are a form of Voice Enabled Domain Names. They are essentially a word or a sequence of words that are placed into a specific directory and are registered to one unique user. The user is able to configure the word to perform an action. When a visitor or caller speaks the word, the action assigned to it is initiated and will follow the configuration assigned to the action the CallWord was pointed to. CallWords are designed to allow users of Voice Internet to register words that can place calls or perform specific actions. NOTE:

Although one of the functions that CallWords delivers is similar to a voice dialer, the concept of CallWords provides users many other options. The notion of having a permanent registration of a spoken utterance capable of initiating multiple actions and be publically available is an advantageous feature of the present invention.

Before domain names, there were only IP addresses. And before CallWords there were only phone numbers. A CallWord performs the same functionality as a domain name. It makes it easier for users to remember how to place a call or initiate computer actions. The caller only needs to speak the CallWord of the person or business they want to get connected instead of having to remember, look up or dial a phone number. Getting a CallWord is very much like getting an internet domain name. The registrant visits a registration portal, searches to see if the CallWord they want is available and if it is, completes the registration by paying a fee. Then the registrant may login and access a website to configure the CallWords.

Figures 8, 9:
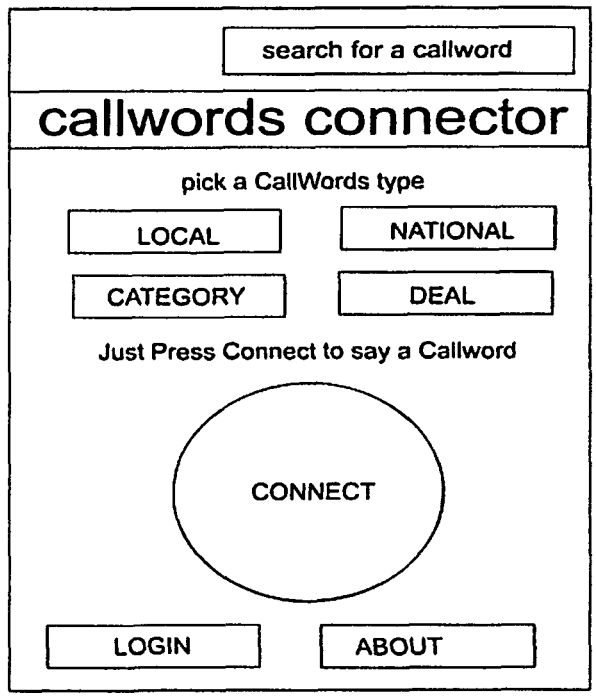
FIG. 8 is a diagram of an embodiment of a CallWord pointed at an action.
FIG. 9 is a diagram of an embodiment of a CallWord accessed from a mobile phone.

In an exemplary embodiment, a CallWord may be registered and configured as follows:
1. Registrant visits website—Selects a type of CallWord to register
   a. National—Single directory for national listings
   b. Category—Specific Vertical market directories (Legal, Home Services, Health, etc)
   c. City/State—Specific City State directories
   d. Fetch—CallWords that call an object and display it on a computer or smartphone mobile device
   e. V-Links—CallWords that initiate a host guided browsing session
2. They search for the type of CallWord they want as shown in FIG. 4A (National), and FIG. 4B. (Local) as well as the category (FIG. 4C).
3. Registrant adds selected CallWordsto cart and checks out as shown in FIG. 5
4. After CallWords is purchased, it will appear in the users account and can then be configured as shown in FIG. 6.
5. CallWord pointed to a phone number as shown in FIG. 7.
6. CallWord pointed at an action as shown in FIG. 8.

Figure 10:
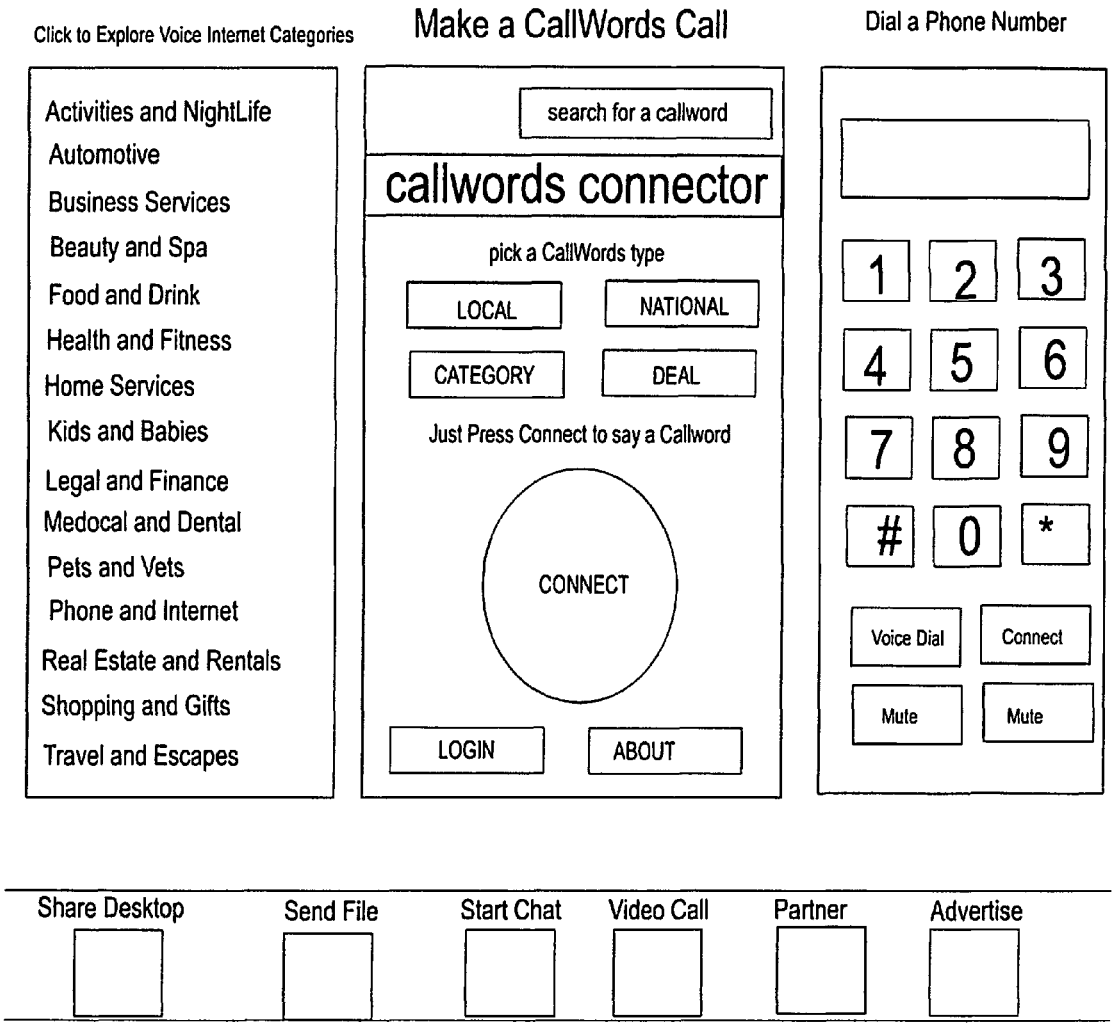
FIG. 10 is a diagram of an embodiment of accessing a CallWord from a computer with a Voice Internet VoIP client installed.
Figure 11:
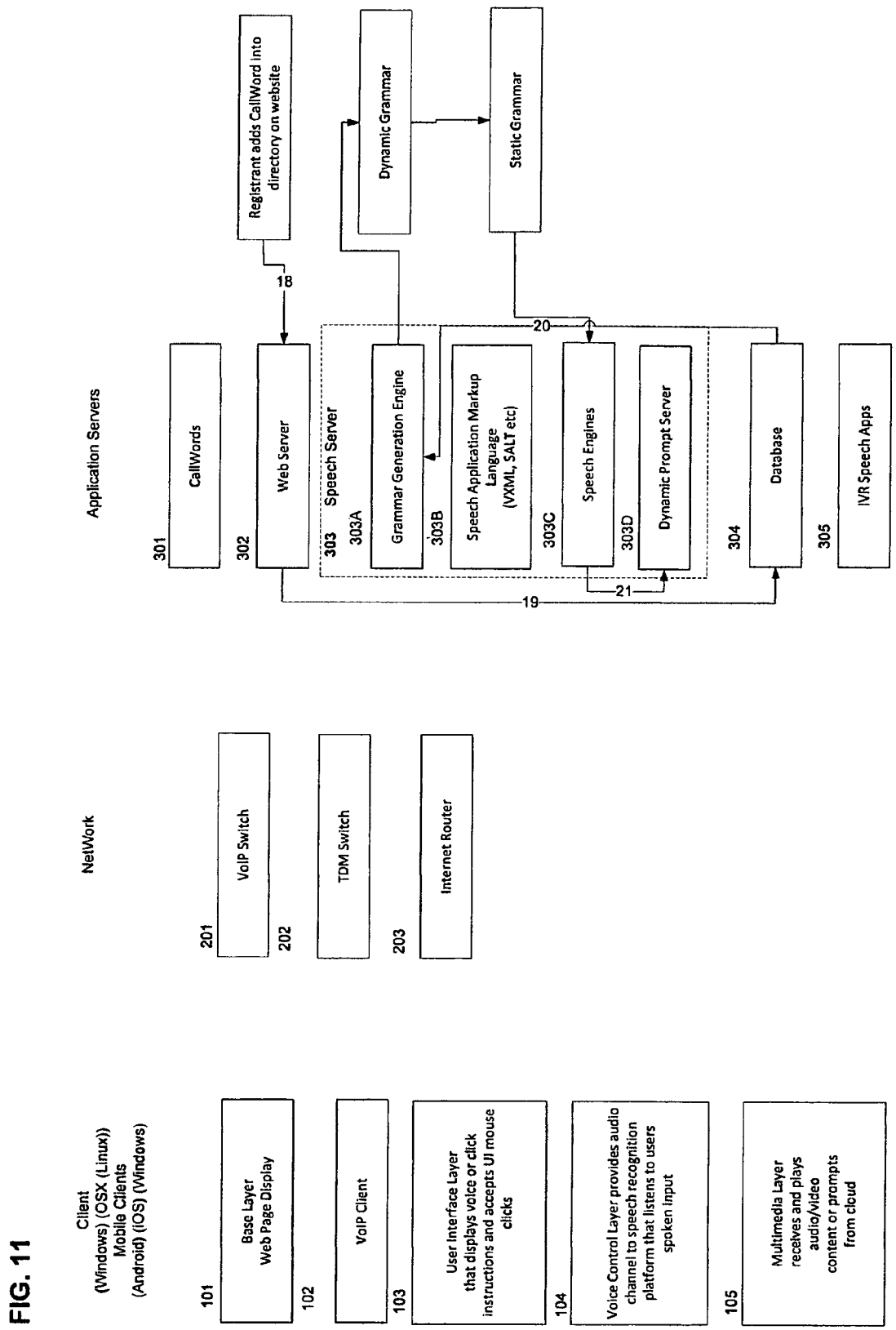
FIG. 11 is a diagram of an embodiment of a CallWord added to Voice Internet's System.
Figure 12:
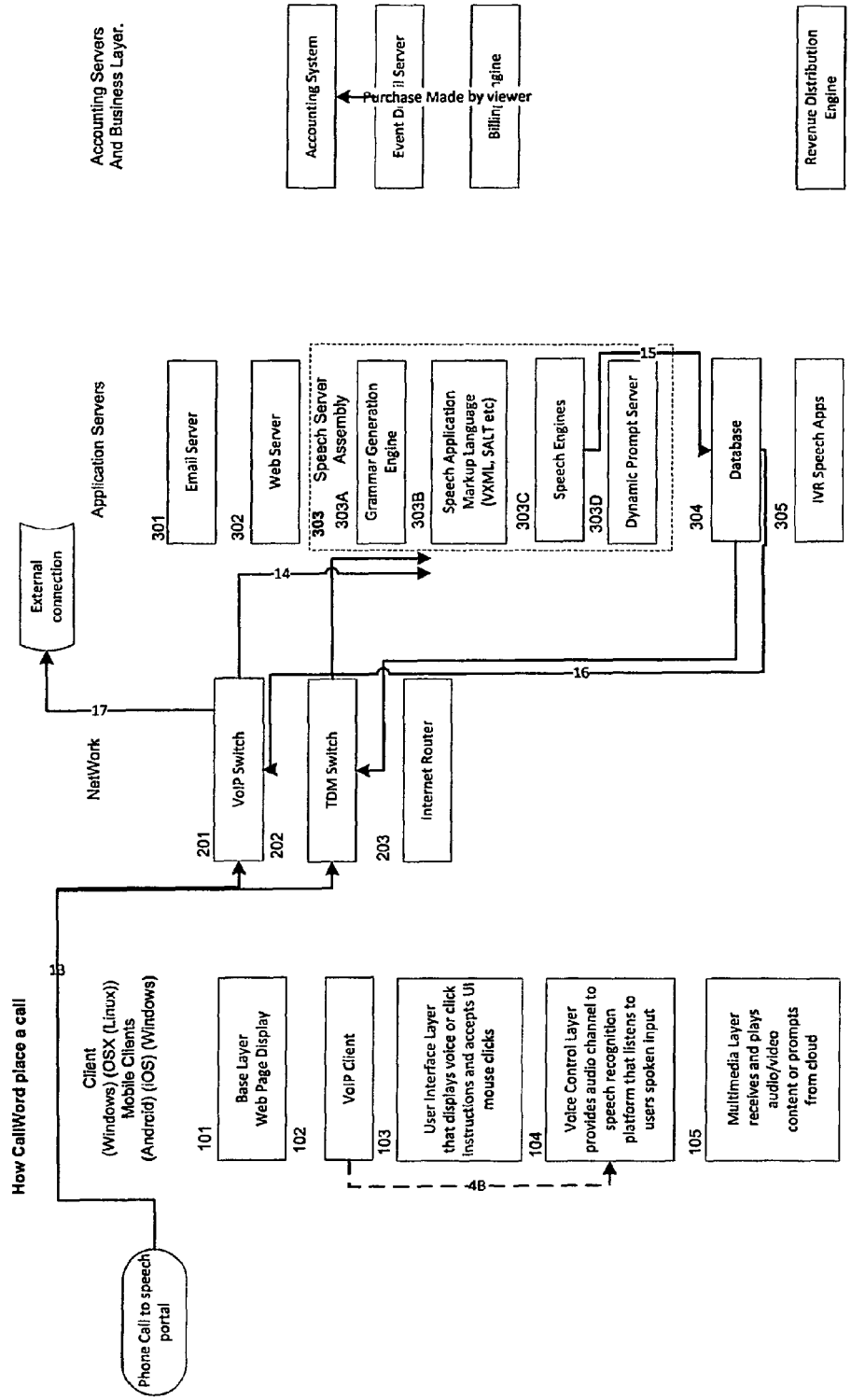
FIG. 12 is a diagram of an embodiment of a call completed with a CallWord.

In an exemplary embodiment, from any phone, a caller may dial an access number (800-555-5555) to the voice portal. The user then navigates to the appropriate directory and speaks the CallWord they wish to invoke. In an exemplary embodiment, a user may access a CallWord from a mobile phone (e.g. Android or iPhone) as shown in FIG. 9 and as described in the following procedure:
1. The user selects a directory
   a. Local—Say the city and State—Then the CallWord
   b. National—Say the CallWord
   c. Category—say the category—then the CallWord
   d. Deal—Say the CallWord
2. The user clicks the select button
3. User is then connected to the appropriate Directory and speaks the directory or the CallWord of the person they want to call or the action they want to invoke.
4. The system then forms a connection to the platform via a TDM or a VoIP channel
5. The outbound call is made and bridged or a call to the application/action is initiated In an exemplary embodiment, a user may access a CallWord from a computer with a Voice Internet VoIP client installed as shown in FIG. 10 and as described in the following procedure:

1. User accesses VoIP panel and executes instructions to CallWord application.
2. The user selects a directory
   a. Local—Say a city and State—Then the CallWord
   b. National—Say a CallWord
   c. Category—say a category—then the CallWord
   d. Deal—Say a CallWord
3. The user clicks the select button
4. User is then connected to the appropriate Directory and speaks the directory or the CallWord of the person they wish to call or the action they wish to invoke.
5. The system then forms a connection to the platform via a VoIP channel
6. The outbound call is made and bridged or a call to the application/action is initiated In an exemplary embodiment, a CallWord is added to Voice Internet's System as shown in FIG. 11 and as described in the following procedure:
1. Registrant adds new CallWords to system on website
2. CallWord is added to database via web server and associated to a specific directory with a stored procedure
3. CallWords is processed by grammar generation engine and added to a dynamic grammar database. There are 2 distinctive types of grammars; a dynamic type and a compiled static type. New utterances to the grammar are always added to the dynamic sector so they will be immediately recognized when a user speaks the CallWord. At the end of a cycle, all entries that are added to the dynamic grammar are compiled into a more permanent static XML database to improve both lookup speed and accuracy. The static database is then cached and made available in memory on all farmed speech server assembly machines for immediate and rapid system access by the speech engine.
4. An association is then made with a dynamic prompt server to deliver a text to speech or recorded confirmation prompt In an exemplary embodiment, a call is completed with a CallWord as shown in FIG. 12 and as described in the following procedure:
1. Caller calls into the system with a phone number. Call is routed by phone network to TDM or VoIP switch
2. TDM or Switch routes call to speech server assembly. Speech server prompts caller to speak a CallWord
3. Speech Server recognizes utterance and passes result to database
4. Database retrieves phone number to dial and passes it to TDM or VoIP switch
5. TDM or VoIP switch completes call to destination A CallWord may also be configured to initiate many actions other than a call connection.

An action may consist of an initiated phone call that forms a communication connection between the user and another party.

Figure 13:
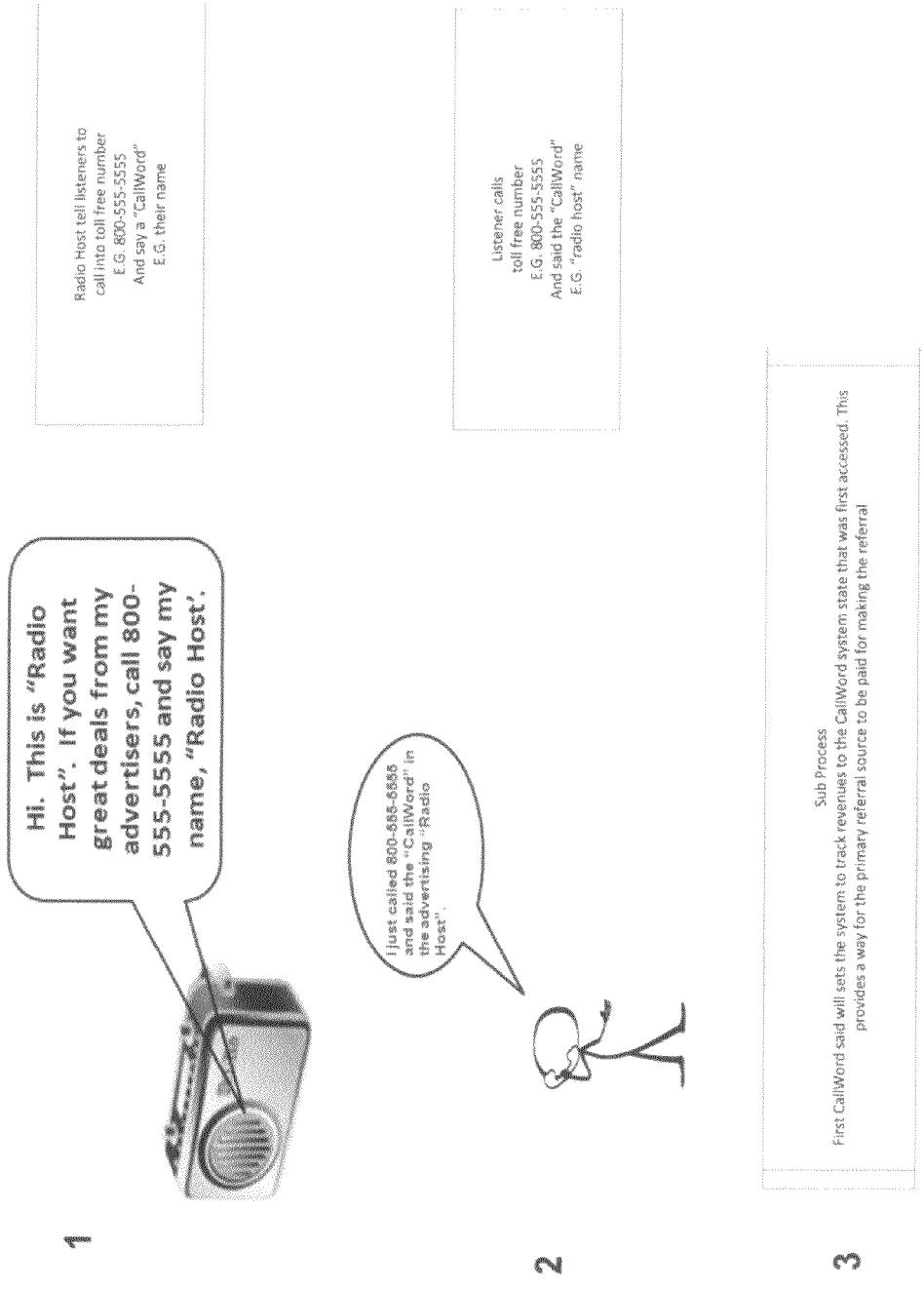
FIG. 13(A) is a diagram of an embodiment of a voice activated coupon delivery system.
FIG. 13(B) is a diagram of an embodiment of a voice activated coupon delivery system.

An action may consist of a connection to another intermediate Voice Internet speech application such as a Virtual Receptionist, an automated interview agent or an automated IVR call center An action may consist of a request to receive an emailed document or object to the initiator An action may consist of a request to "fetch" a web page or deal to a mobile device or browser An action may consist of a request to "push" a web page or deal to a remote device or browser An action may consist of an initiation of a host guided interactive browsing session An action may consist of a call to initiate a market search Voice Activated Coupon Delivery Voice Activated Coupon Delivery is a concept which leverages the popularity of discounts among consumers with the ease of a phone call, delivering a highly targeted potential customer to an advertiser which maximizes the efficiency from a marketing standpoint. This component associates an end user's caller identification and user profile in order to immediately deliver requested information or to purchase a certificate over the phone; if the caller has a known user profile which is detected by the system, the system will enable the caller to speak a CallWord and request that an email be sent to them; and if an email is delivered to the caller, it contains a link to a Website or specific Internet landing page which enables the advertiser to track the identity of the requesting party. In the event that a caller does not have an existing Voice Internet user account, they are transferred to a live call center where an account is established (e.g. only an email and phone number may be required) in order to process the purchase. An exemplary embodiment of a voice activated coupon delivery system is shown in FIG. 13.

These are special use CallWords designed to allow a user to say it to fetch a deal coupon to their computer or mobile device or push a web page or document to another person, computer or mobile device.

The same underlying technology of our system will be deployed in a manner to make this function work.

There are several iterations of the technology.

In all cases, it is required that the user has an account in the system and has either downloaded our VoIP client, mobile application or has registered and verified their name, email address and phone number with our system and that this information is readily available to us at the time the request comes in.

For example, a radio host can say on air that callers should call in with their phones and say "_____" CallWord to get the deal information emailed to them. Or if they have the mobile application they access the "deal" category and say the CallWord of the deal they want. Finally, a request can be made from a computer that has the VI VoIP Voice toolbar installed by selecting the deal category and saying the appropriate CallWord.

Figure 14:
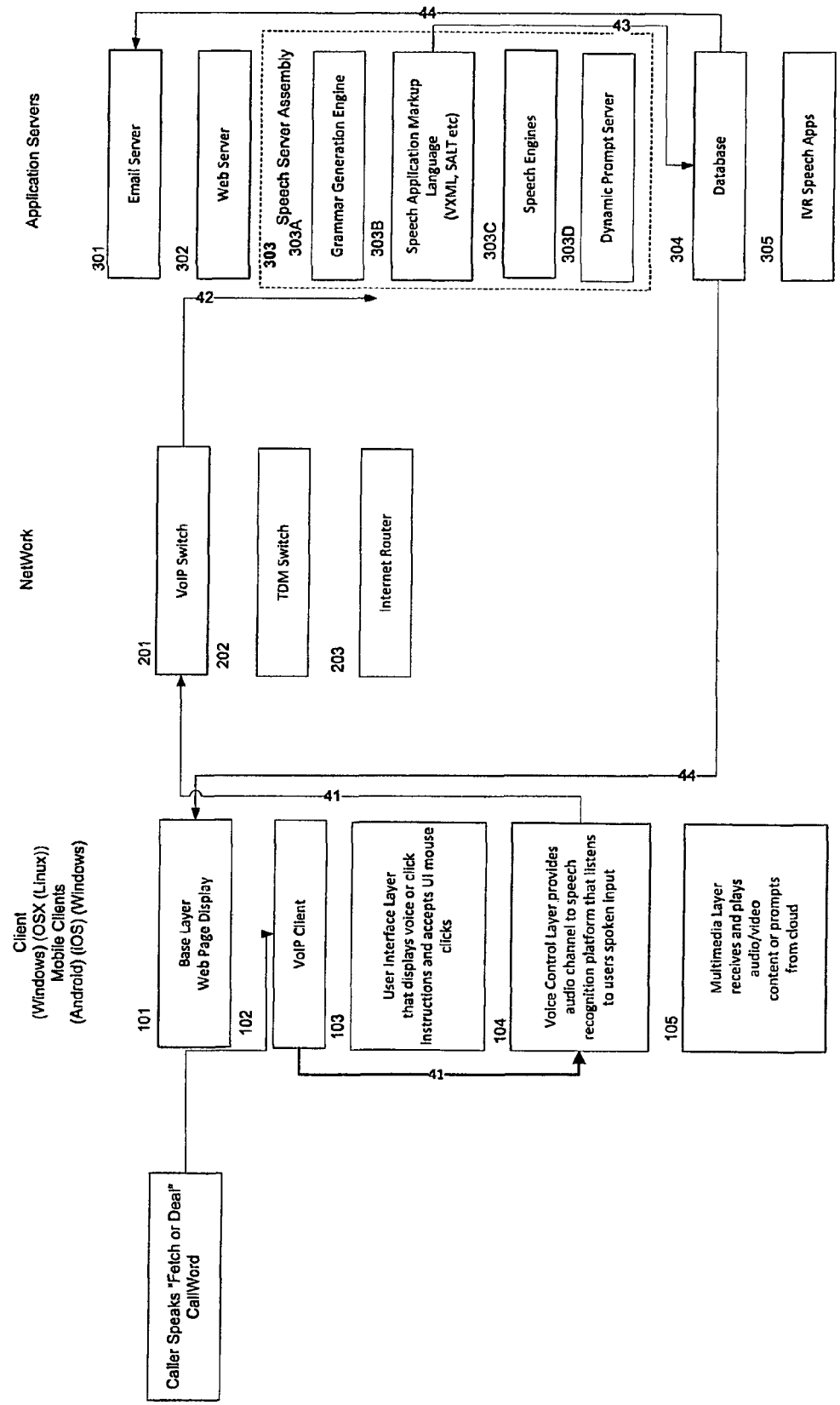
FIG. 14 is a diagram of an embodiment of a deal fetched using a CallWord.
Figure 15:
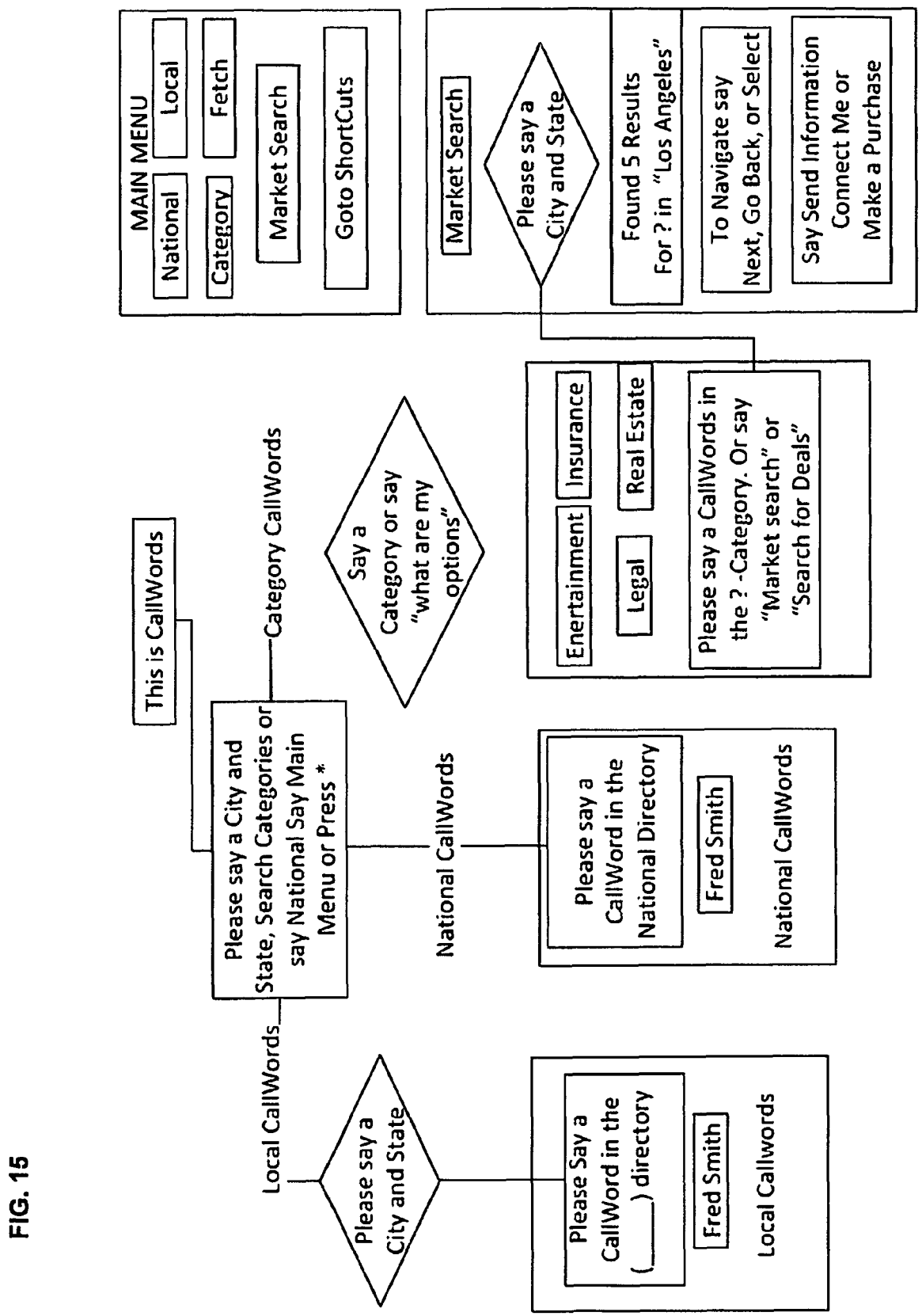
FIG. 15 is a diagram of an embodiment of CallWords used through the Voice Internet System as a navigational device.

In an exemplary embodiment, a deal is fetched using a CallWord as shown in FIG. 14 and as described in the following procedure:
1. Caller speaks "deal/fetch" CallWord into Phone, Computer Microphone or into smartphone application
2. Voice Control layer captures users utterance and passes it to VoIP switch
3. VoIP switch passes request to Speech engine to determine query to send to database
4. Database query results in obtaining proper URL and pass to the web server for retrieval
5. Web server requests page or document to be sent to the base layer web page display in the client or to the email server for transmission of email CallWords are also used through the Voice Internet System as a navigational device as shown in FIG. 15. For example when we deliver results from a market or deal "search" the viewers can speak a displayed CallWord to navigate to a specific page. When a caller enters the CallWords portal, they are greeted by a prompt to use CallWords by speaking the name of a directory (e.g.: "national" "local" "category" "deal"). Then upon recognition of a valid CallWord the caller will be transferred to the phone number, an application or to an action previously associated with the CallWords by the registrant. They may also say "Main Menu" at any time to return to the main system controls.

If instead of saying the name of a company the user says "go to" or "go to" followed by the name of a recognized city or category (e.g.: "Los Angeles" or "Travel"), the main portal application will transfer control to another speech application that will provide directory service facilities for the requested category. From there, the user can select the person or company they'd like to call or the action to be taken.

This GoTo "Domain" strategy modeled after the .com and .net Internet domains, eliminates the barrier of oversaturated grammars, enabling Call Words to populate millions of utterances while maintaining an extremely high degree of accuracy.

Main Portal

Calls to the main portal are services by a suite of 3 speech applications:
   The main portal application that responds to callers dialing 800-555-5555 or any other voice portal entry point. This application can transfer callers directly or indirectly to customer endpoints, or to the personal assistant application.
   A domain locator application that allows callers to select a specific category or city to search. This application is accessed by callers responding to "go to" when prompted by the main portal application.
   A directory service application. This application is accessed either directly from the main portal (by responding "go to" followed by a recognized domain name) or from the domain directory locator application.

As was previously described, this application responds to callers that dial 800-555-5555 or enters the portal on a VoIP client, and serves as the entry point for accessing both the public voice extranet, the private voice intranet, or the Voice Internet Web.

The following dialog illustrates the interaction between a caller and the application when the user responds to the main prompt with the name of a company that has registered a top-level CallWord:

---

(call arrives from 800-555-5555) or from VoIP Client on computer or mobile device
System   Welcome to call words. Please say a call word or say another directory to use
User     Category
Scenario 1

System   Say the Category you want
User     Legal
System   Say a CallWord in the legal category or say "search for deals"
User     Ketchup and Associates
System   Did you say Ketchup and Associates
User     Yes
System   Please stand by while I connect you.
         (application transfers call to the phone number associated with United Airlines)
Scenario 2

User     Search for deals
System   Say a city and State
User     Los Angeles, California
System   I have 5 results - You can navigate these results by saying the result CallWord, next result or go back

---

Note that the above example illustrates a scenario where Scenario 1) the customer (Ketchup and Associates) has configured their endpoint to transfer calls to their actual phone number. The customer could also have configured their endpoint to transfer control from the main portal speech application to an auto attendant, or otherspeech application. Or Scenario 2) The customer has chosen to be part of a market search action.

Also note that instead of responding with a recognized top-level CallWord, the caller could have also chosen to respond with "main menu" or "go to shortcuts" to access $2^{nd}$ level directory services, or "login" to authenticate themselves to the system and access their personal assistant. These scenarios are presented in later sections.

Figure 16:
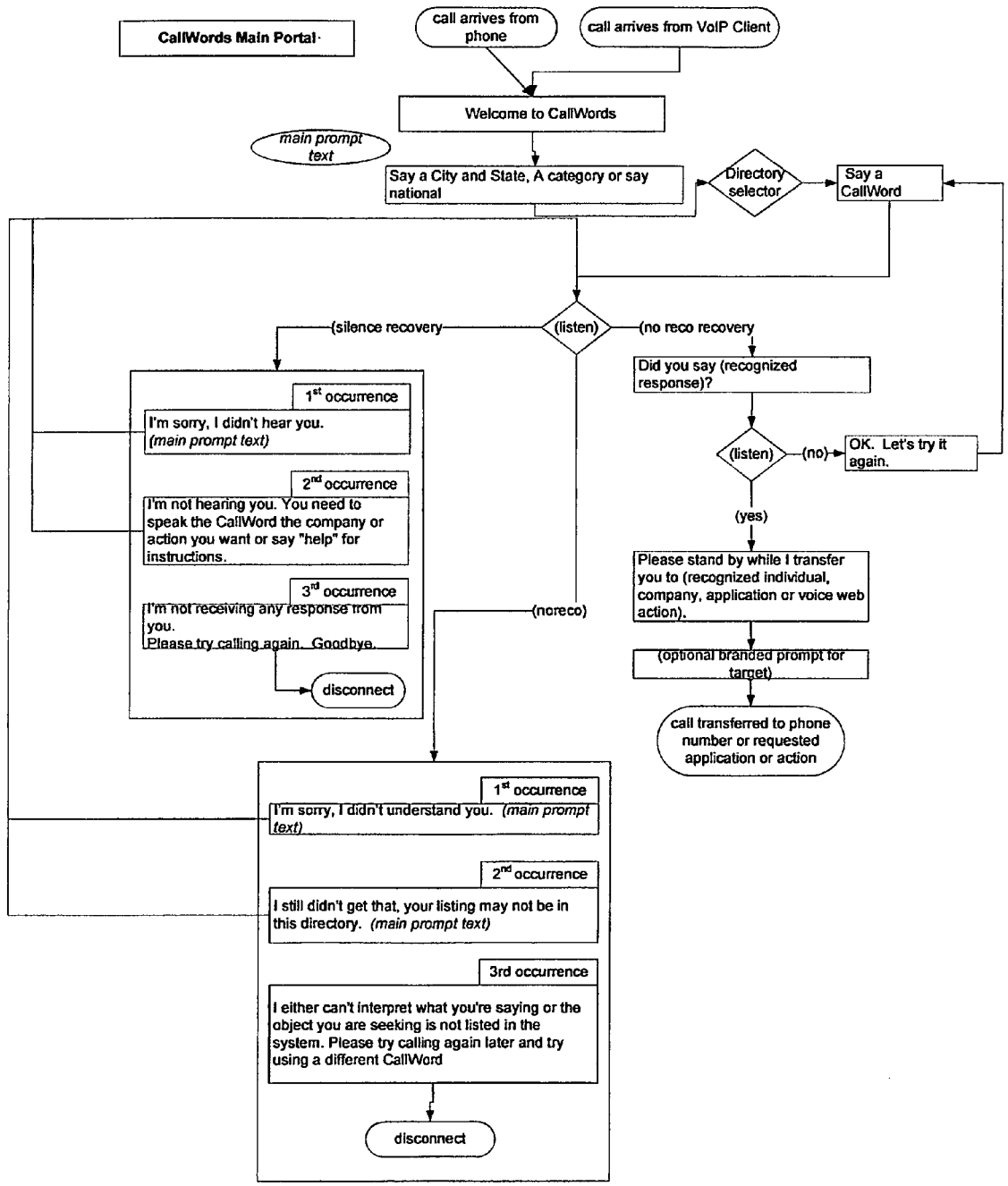
FIG. 16 is a diagram of an embodiment of a dialog flow corresponding to the main portal application.

The dialog flow corresponding to the main portal application is illustrated in FIG. 16: The main purpose of this application is to provide direct access to top-level or to serve as a gateway to other speech applications or actions by supporting "transfer to different directory" commands.

The grammar associated with this dialog, not counting confirmation grammars and commands, is one that supports a choice of "Call Words" (utterances) that have been purchased by CallWords customers. This grammar, which is relatively simple architecturally (basically a large <one-of> in SRGS terms), is automatically updated whenever a new or existing CallWords service customer purchases a new CallWord to associate with their account.

In practice, two grammar resources will be used to process CallWord recognition:
1. A precompiled (static) grammar resource containing all of the CallWords that have been registered with the system grammar generation engine before 3 A.M. the previous evening. This grammar resource will be cached by the speech engine.
2. A dynamically composed grammar reflecting new CallWords (if any) that have been registered with the system since 3 A.M. the previous evening.

This approach allows leverages speech engine grammar caching to achieve the best recognition performance possible, while still allowing new CallWords to be instantly deployed. Each night at 3 A.M., newly registered CallWords will be automatically merged into the primary static grammar, precompiled, and redeployed.

Note that the web-based interface that customers use to register new CallWords with the system are subjected to both lexical analysis (to avoid CallWord duplication) and phonetic analysis (to avoid adding ambiguity to the system by allowing new CallWords that are phonetically "close" to existing CallWords). Only new CallWords that pass these two tests will be added to the system, becoming instantly available as part of the dynamic grammar described above, and then compiled into the static grammar the next evening.

For business reasons, top-level CallWord selection is always confirmed explicitly. Recognizer confidence scores are not considered. Several commands are also supported during the main dialog, and generally fall into 3 categories:

These utterances result in context-sensitive information being played to the caller. Once the information has been played, control remains in the dialog. Supported utterances include:
   more info—provides more information about the CallWords® service.
   help—provides instructions for using this application.
   repeat—causes the application to replay the most recent prompt.
   where am I—tells the user which application they're currently interacting with.

These commands, with the exception of more info, are supported globally in every CallWords speech application.

These utterances allow the caller to navigate both locally within the dialog as well as globally (accessing other speech applications). Supported utterances include:

start over—causes the current application to reset itself and start again at its topmost dialog element (QA).

back—behaves like the "back" button on a browser, allowing the user to backup to the previous dialog element.

login—transfers control to the personal assistant speech application.

go to [domain]—transfers control to either the domain locator speech application ("go to") or directly to the directory service application for a requested domain (e.g.: "go to Los Angeles").

operator—transfers the caller to the operator.

Whenever a caller responds to the main portal prompt by saying "go to shortcuts" without also specifying a domain (e.g.: "Los Angeles"), control is transferred to this application. From here, the caller is prompted to specify the name of a city or category (domain) they would like to search.

The following dialog illustrates user/system interaction when the user responds to the main CallWords prompt by triggering a globally available navigation command by saying "go to".

```
(call arrives at 800-555-5555)
System      Welcome to call words toll-free connections. Please say
            a call word or the name of a company you would like to
            connect to, or say go to to search to another directory.
User        go to
(navigation command handler transfers control to an intermediate "go to"
speech application)
System      Which directory would you like to go to?
User        Legal
(recognizer reports >=0.90 confidence, confirmation skipped)
(application transfers control to the directory services application)
System      You've reached the Legal Category directory service.
            Please say the CallWord of the company or individual
            you want.
User        Ketchup and Associates
System      Did you say Ketchup and Associates?
User        Yes
            (application transfers call to the phone number on
            account associated with Ketchup and Associates)
Or action   (application fetches URL to web browser or emails
            specified document to requestor
```

The above conversation scenario also illustrates the caller's subsequent interaction with the directory service application once a domain ("Legal" in the above scenario) has been selected. This section will only discuss the operation of the "go to" domain locator. A more detailed discussion of directory service application follows in the next section of this document.

Figure 17:
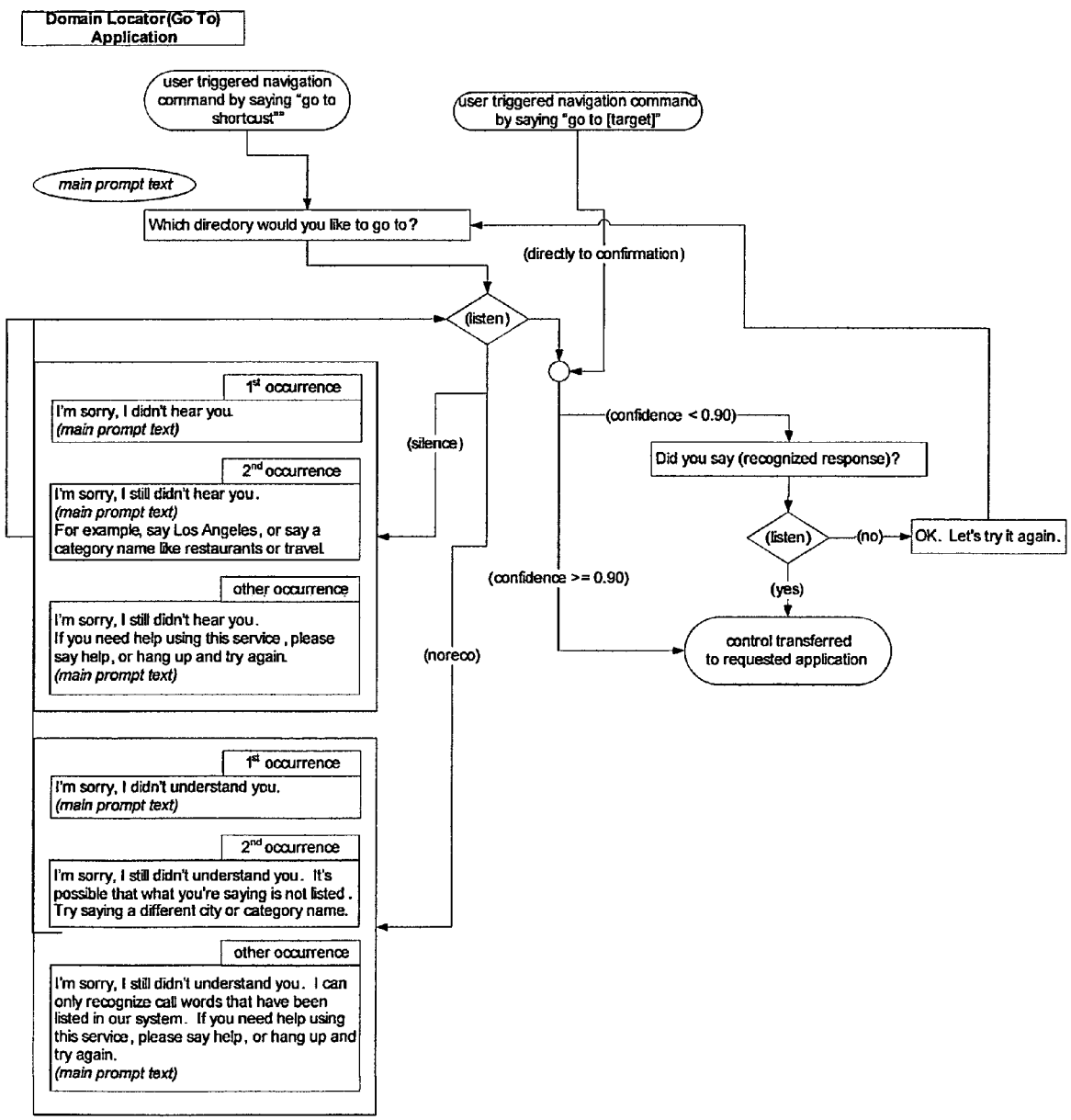
FIG. 17 is a diagram of an embodiment of a dialog flow supported by a domain locator application.

The dialog flow supported by the domain locator application is illustrated in FIG. 17. Whenever a caller responds to the main portal prompt by saying "go to" without also specifying a domain (e.g.: "Los Angeles"), control is transferred to this application. From here, the caller is prompted to specify the name of a city or category (domain) they would like to search. The primary grammar used for this application is one that supports a choice of utterances, each of which identify a domain recognized as part of the CallWords service. Domains are organized both by city (e.g.: "Los Angeles") and by category (e.g.: "airlines"). In many cases, more than one utterance will map onto the same domain. For example, "restaurants" and "dining" might both correspond to the same searchable domain.

Unlike the main portal application, this application will use confidence scores reported by the recognizer to confirm user input. For recognition results reported with a confidence of 0.90 or greater, confirmation will be skipped. For recognition results reported to the application with a confidence score that is less than 0.90, a specialized "yes/no" grammar that supports 3 kinds of responses will be used:

User can respond "yes" to confirm the recognized value.

User can respond "no" to reject the selection and be reprompted to enter the requested information.

Respond "no, I said [corrected value]" to reject and simultaneously correct the recognized value.

The first two scenarios are standard. The third scenario, where the user rejects and also corrects the CallWord selection simultaneously, is illustrated by the following dialog scenario:

```
System      Please say the name of a city or a category you would
            like to search.
User        Los Angeles
(a similar, but incorrect domain name was recognized for some reason,
confidence < 0.90)
System      Did you say Las Vegas?
User        No. I said Los Angeles.
(recognizer reports "Los Angeles" with a confidence of >=0.90)
(application transfers call to the directory service application for the
Los Angeles domain)
```

Allowing correction during rejection of a confirmation prompt in this manner allows the dialog between the user and the system to remain as streamlined and efficient as possible, even in the face of a recognition error.

The standard help and navigation commands as described in previous section are also supported in this application.

Domain Directory Service

The domain directory service application provides a straight forward search facility for locating the name of a company or individual that is registered in a given domain. This application can be reached from the main portal application by saying a listed directory name or by saying "go to shortcuts" followed by the name of a domain, or by saying just "go to" and subsequently using the domain locator service that was described in the previous section to locate a domain to search.

Once a recognized Call Word has been spoken by the user, control will transfer to the corresponding customer's configured endpoint (either a phone number or a speech application such as the auto attendant, call screening, or voice mail applications).

The following dialog illustrates user/system interaction when the user responds to the main portal prompt by saying "go to Los Angeles", or by using the domain locator application to indirectly select the "Los Angeles" domain.

```
(caller says "Los Angeles" from the local "CallWords" directory or uses
the domain locator to select the "search by city" directory to access the
Los Angeles directory)
System      You've reached the Los Angeles directory service. Please
            say the CallWord you want in the Los Angeles Directory
User        Joe's Pizza
(recognizer reports a confidence score of >=0.90)
application transfers call to the phone number or action event associated
with the CallWord "Joe's Pizza"
```

Figure 18:
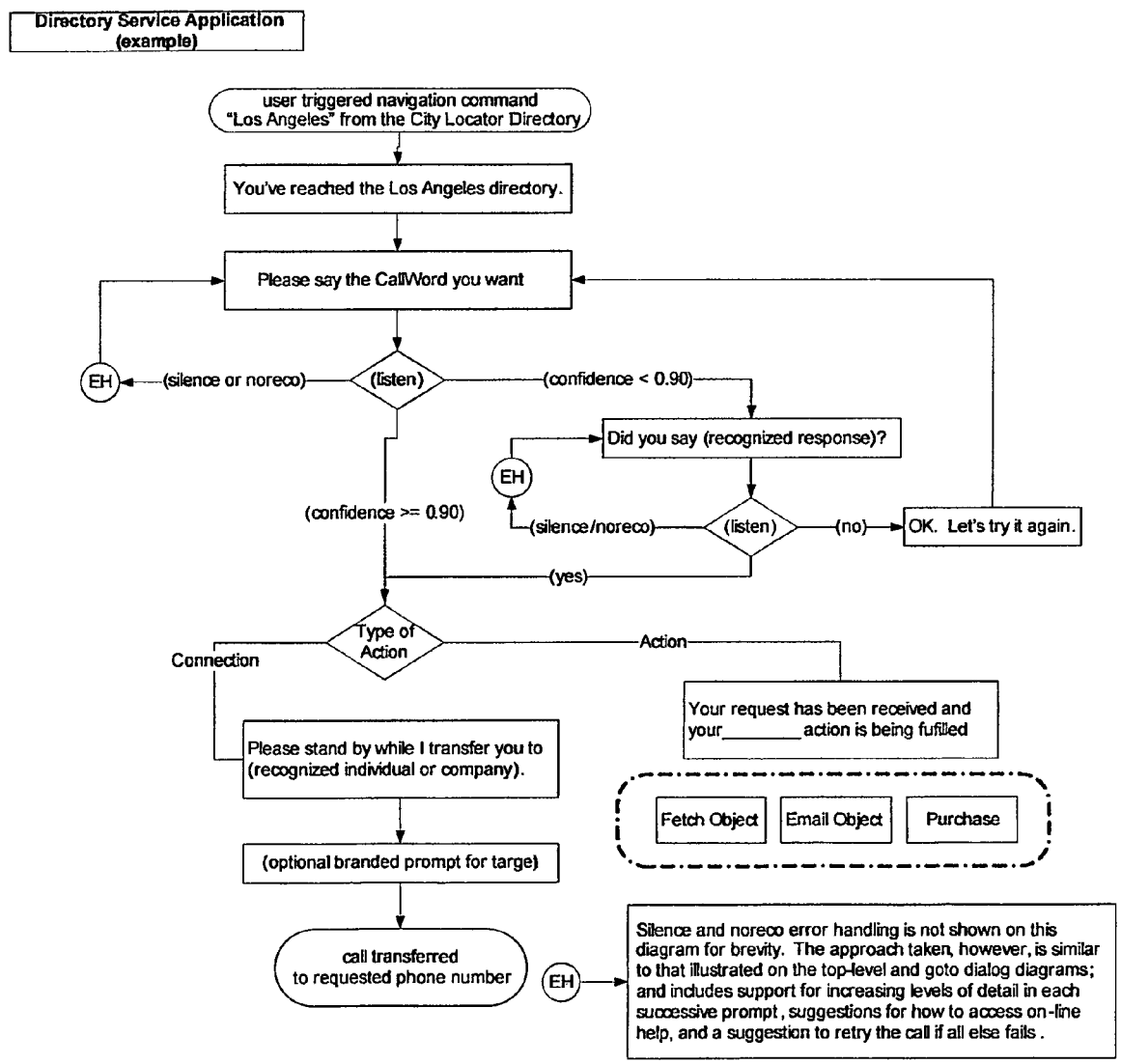
FIG. 18 is a diagram of an embodiment of a domain directory service.

FIG. 18 illustrates the domain directory service.

The grammars associated with this application are designed to support a directory service application where the user is asked one or more questions to help identify the connection or action the caller wishes to initiate. The actual set of utterances recognized by the main grammar will differ depending on which domain is being searched.

Host Guided Browsing Web Interface

Host Guided browsing enables a host to guide viewers to a web page or a series of web pages by using a speech activated interface and an interactive verbal dialogue. Prior to this invention, web browsing and search functionality completely depended on the user's ability to navigate the web and intuitively make decisions on which URL's to enter into the browser's address bar, queries to search engine or impulsive decisions to click on links or banners. This invention allows the user to engage into an interactive dialogue with the host to as a control mechanism to navigate the web. An Example of how a host guided browsing session works is shown in FIG. 19.

Current methods of searching the internet require the user to enter a search term, review the results and then make one or more selections to visit web pages that are discovered by means of the internet search. Often results from a particular search query can be in the thousands or even millions. Viewers are often overwhelmed by the number of available choices and may only choose to follow one or several links to view the pages associated with the search result.

After they visit the page that was linked to the result, the viewer is left to their own means and to view content displayed on the resulting website to either make a decisions to take an conversion action such as a purchase or place a phone call to the business operating the website.

However there are many people who prefer to be guided to a website or referred to a company by someone they know and trust. The concept of celebrity referrals is not new. There is a term call the "Opera Effect" which refers to the phenomena of a mass sale of a product after she endorses it during her broadcasts. The same principals apply to a lesser degree to any endorsement of a product or service or by any celebrity.

Host guided browsing will create a user experience where a host can be selected to help guide the view through an interactive chain of results. The viewer simply interacts with the host by speaking or clicking on choices that are made available to them during their browsing session.

A host can be in the form of audio or a video format, and can be portrayed by a celebrity, a music star, a "talk radio" show host, or a non-famous personality who can provide expertise on any subject material. It can also be am animated character.

As the view interfaces with the host, a variety of resulting actions can occur, For example, the host might ask the viewer what subject they are interested in finding out a about. After the viewer answers the question, the invention will fetch another page and the host will continue to interact with the viewer. This adds a sense of continuity to the browsing experience as well as enabling the host to provide an audio or visual narrative of what the viewer is seeing on the page that is being visited. Additionally, supporting images can be introduced, overlaid and interfaced with on the base layer website.

The base layer website is contained in an iframe so the viewer remains on the original URL they visited during the entire session.

Another example of a user interaction could be a call connection that is placed upon the users request, or an internet chat session started.

Additionally, the session could introduce a purchase function into the call, place a product into a shopping cart and allow the views to make a purchase, all by using voice commands during their dialogue with the system.

There are other iterations of how the technology can work, for example an "interactive web radio show" where the host provides accompanying visual along with their narrative. As pages are viewed and advertiser's websites are visited, a tracking system has also been developed to charge advertiser for page views and endorsements made by the hosts.

The system is programmed by an interface provided to content providers who can create their own unique browsing sessions, add their own audio and video content and programs links to webpages they wish to include in their host guided programs.

Yet another form of guided browsing included the concept of a voice activated "deal search" component of the system. In this format, advertisers place business profiles and promotional deals into the database via a web interface and the program will deliver these results based on parameters entered into the system by advertisers.

The invention is designed to operate on several computer platforms including windows, OSX, and Linux and on Mobile device systems such as iOS (Apple) Android and on Windows based devices.

Many carriers do not permit VoIP applications to operate on their devices, to permit the operation of our system, we have developed yet another invention that allows a separate voice/audio channel to run in parallel with a host guided browsing session. Because telephonic voice communication is prohibited on the VoIP circuit, a separate device such as a cell phone could be used in conjunction with a tablet. The voice input to the system would come from the phone and the audio visual output would be streamed back into the visual device from the cloud.

The invention is compromised of the following components

Figure 20:
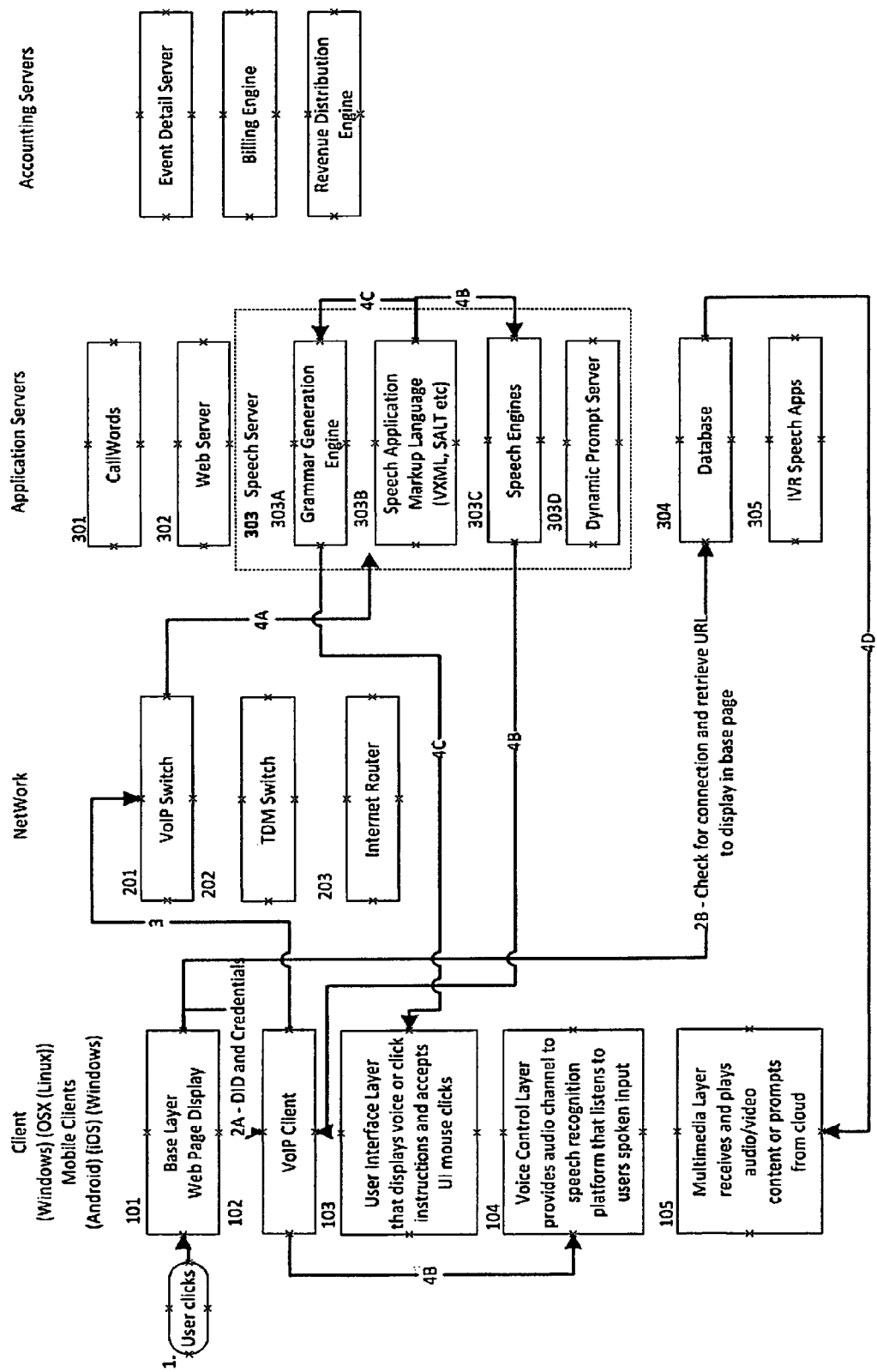
FIG. 20 is a diagram of an embodiment of how a Voice Browsing Session is initiated.
Figure 21:
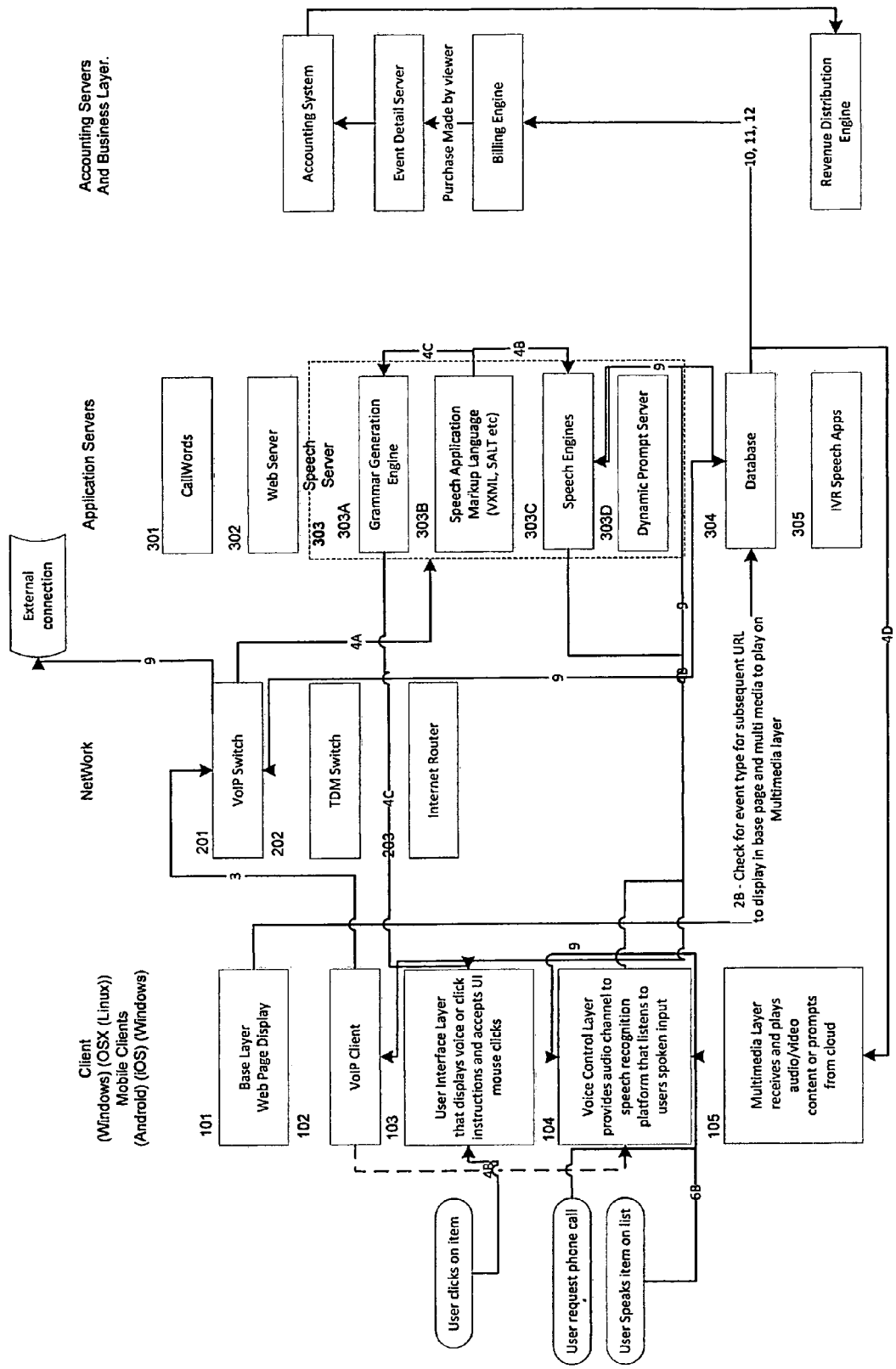
FIG. 21 is a diagram of an embodiment of how a Voice Browsing Session works in a connected state.

1) A client is installed onto the user's computer and consists of the following components
   a. (101) An iframe that displays the base layer web page display
   b. (102) A VoIP Client that provides telephony capabilities to the device
   c. (103) A user interface layer that displays a list of selection that can be spoken or clicked to interact with the invention
   d. (104) A Voice Control Layer that transmits audio input such as spoken commands or DTMF signal to the VoIP Switch and subsequently to the Speech Server component. The Voice Control layer can work on the same device that the client I installed on or can send a signal for the VoIP switch to call another device such a cell phone to accept audio input from an alternate device if the primary device cannot create its own telephony connection
   e. (105) A Multimedia Layer that receives audio and video streaming from the cloud to play video or audio content or user interface prompts FIG. 20 shows an exemplary embodiment of how a Voice Browsing Session is initiated with procedure as follows:
   1. User Clicks on control embedded in Base Web Page (101) to initialize session—
   2A. VoIP client is provided with DID and User credentials
   2B. Database is queried for connection status and to get data on which URL to display
   3. VoIP client establishes connection with VoIP switch
   4A. VoIP switch connects to speech server.
   4B. Speech Server connects Speech Engine via VoIP client (102) to Voice Control Layer (104)
   4C. Speech server instructs Grammar generation engine to display available options in User Interface layer
   4D. Database provide content streaming instructions to Multimedia layer and plays audio or video content or UI prompt FIG. 21 shows an exemplary embodiment of how a Voice Browsing Session works in a connected state with procedure as follows:
1. The user interface layer contains a listing of all the words that can be said or clicked on to initiate a secondary action. (103)
2. User click on an item in (103) to initiate transmitted data to the web server or a DTMF signal sent to the Voice Control Layer (104)
3. User speaks an item from the listed grammar in the user interface layer (103)
4. Database is queried for event associated with click or spoken term to check for the event type and the subsequent URL to display on the base layer (101) and for the multimedia file to stream into the multimedia layer (105).
5. If a user request a phone connections, the request is directed to the speech server (304) to query the database for the phone number to dial
6. The phone number is passed to the VoIP switch (201) to dial the number and connect the call.
7. If a users requests to "get the deal" the speech server queries the database for the deal URL and displays the page
8. If the user requests to "make a purchase" the item is added to the shopping cart.
9. When the user requests to "Check Out" the speech server makes a call to the database to retrieve the users credit card number and charge the card.

Interactive Control of Video Resources

Figure 22A:
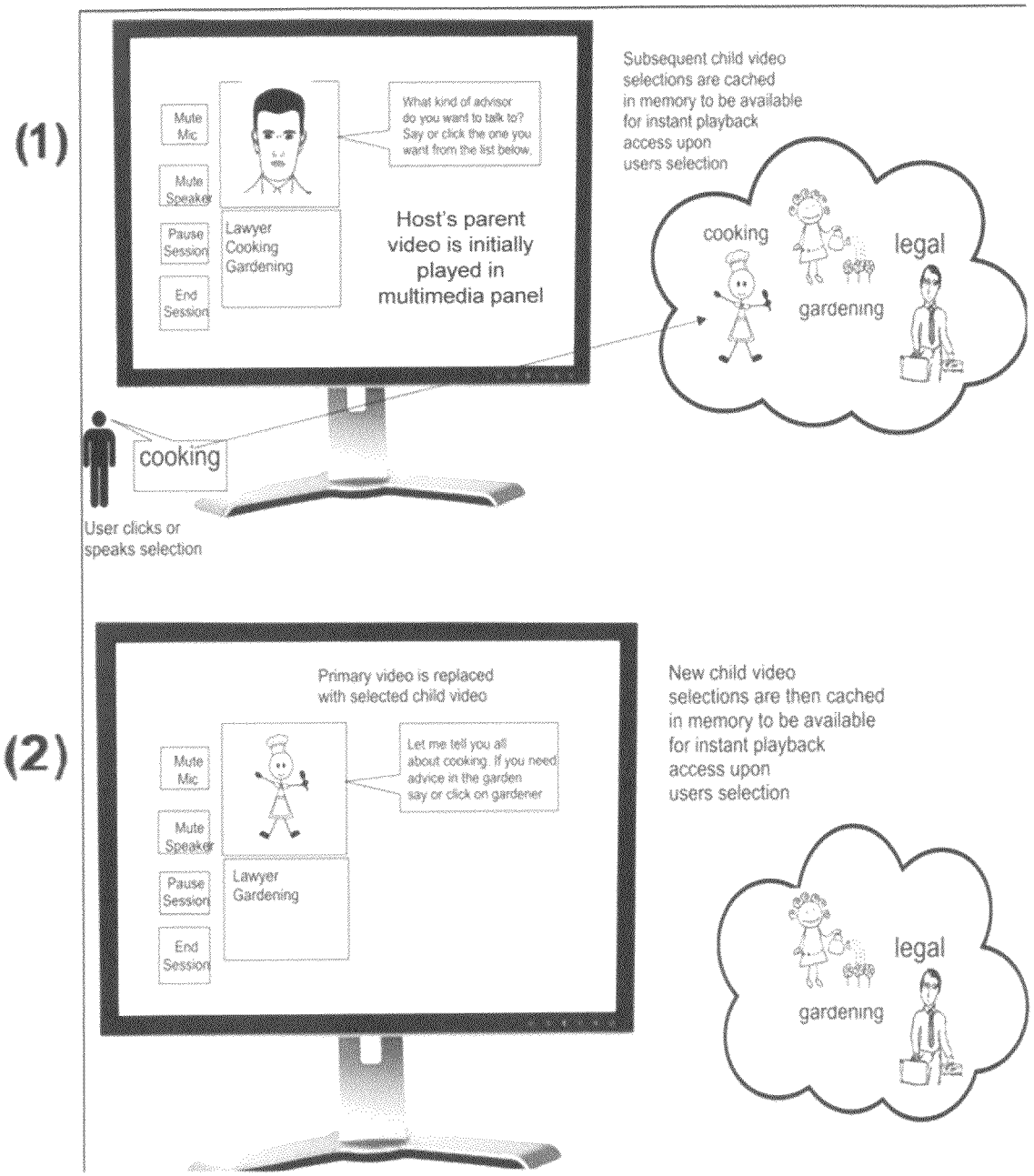
FIG. 22(A) is a diagram of an embodiment of an interactive session with a user.

Host guided Interactive video is yet another iteration of how the same underlying technology works with interactive video hosts and base layer web pages. The viewer simply talks to the video that is playing in their browser on an application on their smart phone. FIG. 22 shows an interactive session with a user with the following procedure:
1. Introductory page allows viewer to interact with primary video
2. After viewer responds to primary video, next clip is ready to play.
3. Cached video clip replaces primary clip and new preload begins
4. New video is accessed from cache as well as new base URL Instead of a Multimedia audio file being played in the multimedia layer, a primary video clip is immediately played and a set of alternative secondary videos clips are loaded into the client's memory cache. In order to provide a seamless transition between videos, it is necessary to load a full set of video clips instead of just the primary video. If this is not done, there is a resulting delay between the time of the request and the play, while the subsequent video is streamed or loaded to the browser. The result is that the viewing experience is interrupted.

The preloading process needs to transpire while the primary video is playing. This process insures that when the viewer says or clicks on a selection in the user interface layer, the requested video is immediately made available to the viewer to provide a real time interactive experience.

To provide a seamless user experience the system will use HTML5 to preload all of the subsequent alternative clips that will play after the user verbalizes a response.

Since all the clips are already loaded in the client computer, the selected clip will immediately interrupt the playing of the current clip and start playing the subsequent clip. This can happen simultaneously while a new web page is be loaded.

Figure 23:
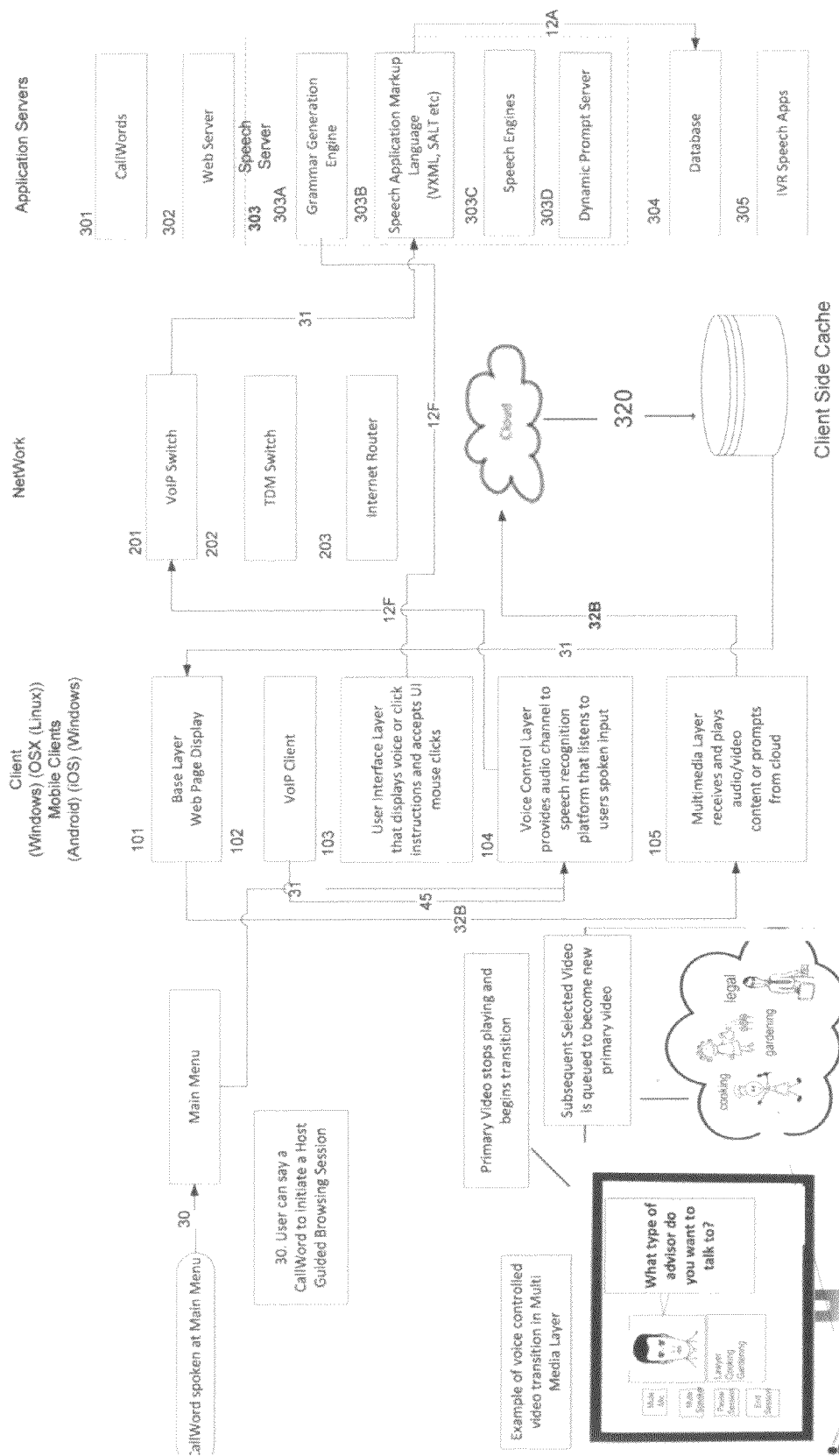
FIG. 23 is a diagram of an embodiment of a detailed interactive session with a user.
Figure 24:
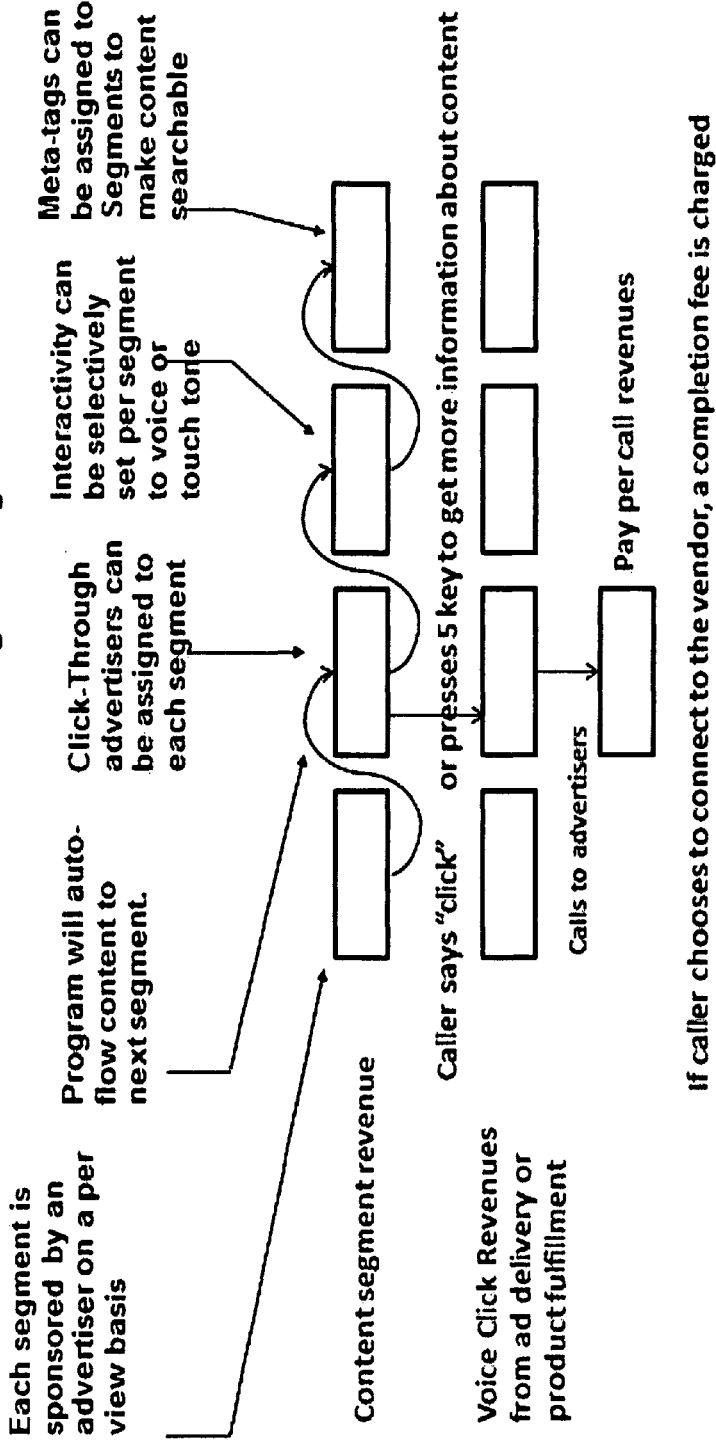
FIG. 24 is a diagram of an embodiment of technology for radio-active programming.

The effect to the end user will be that of a perceive intelligence as if the video actually understood what was said by the user. FIG. 23 shows an exemplary embodiment of a detailed interactive session with a user is accomplished with procedure as follows:
1. After logging into VoIP ClientNoice Browser at the main menu,
2. User speaks a CallWord to initiate a Video Hosted Session
3. Based on the URL associated with the CallWord action several actions are initiated
   a. database is queried to determine the URL of a web page to displayed in an iframe in the base layer web page display.
   b. a primary video associated with the CallWord is immediately played on the multimedia layer
   c. The database is queried to begin retrieval of the Video URLS mapped to the CallWord
   d. The Client side web browser is instructed with an HTML5 tag to preload all child videos into the clients memory from the cloud
   e. The subsequent grammar is fetched and displayed in the User interface layer
   f. The voice control layer is activated to listen for the next user command
4. User says another CallWord from the CallWord list displayed in the user interface layer
5. Speech Server recognizes utterance and passes result to database
6. The same process is repeated each time a new CallWord is spoken
7. Based on the URL associated with the CallWord action several actions are initiated
   a. a new base layer web page is displayed in an iframe
   b. a primary video associated with the CallWord is immediately played on the multimedia layer
   c. The database is queried to begin retrieval of the Video URLS mapped to the CallWord
   d. The Client side web browser is instructed with an HTML5 tag to preload all child videos into the clients memory from the cloud
   e. The subsequent grammar is fetched and displayed in the User interface layer
   f. The voice control layer is activated to listen for the next user command Radio Interactive Programming:

Radio Interactive Programming is an integrated/hybrid media experience which enables users to listen to radio delivered audio content (either via the Web or over the airwaves) and then interact with the corresponding online version of the radio program using speech recognition technology. This enables radio stations to deliver a truly multi-sensory experience; as the end user listens to the broadcast, they can utilize their voice to interact with the radio program's host and the content which is served to accompany the broadcast with voice direction commands, affecting a similar result as clicking a link on the Internet with a mouse. Radio Interactive Programming is unique in that it can be used by a radio station, broadcast network or individual radio program host to deliver additional content (beyond the audio) to listeners; it creates an alternative revenue source for traditional media (i.e. independent radio stations and syndicates) by providing additional means of delivering advertising and marketing messages; it can be utilized to deliver expanded content about a specific product or service; it can be utilized to generate a call from a radio listener to a paying advertiser, which is directly measurable; and it can be used to invoke a voice search program to locate a local resource, which is especially important for soliciting local advertisers on nationally broadcast programs. The technology for radio active programming is described in FIG. 24 relating to host guided browsing.

Voice Front Voice Activated Virtual Routing Utility

This application provides a completely customizable answering service. Before enabling the auto attendant, customers record a greeting to be played whenever the auto attendant application receives control of a call. Customers also record a "main menu" to be played once the greeting message has been played (and potentially numerous times until the caller exits the auto attendant). Customers also configure a set of utterances that should be recognized, and a mapping of each utterance onto one of the following:

A telephone number to transfer the caller to.

A speech application to transfer the caller to (for example, the voice mail or call screening applications described below).

A prerecorded message to be played back to the caller before returning them to the auto attendant main menu.

The following dialog illustrates user/system interaction between a caller and the auto attendant application for a hypothetical ski resort named Big Mogul Mountain:

| | |
|---|---|
| System | Hi, you've reached the Big Mogul Mountain luxury ski resort. |
| System | To hear current ski conditions, say report. To arrange for lessons or talk to someone about equipment rentals, just say school. To plan a fantastic winter getaway, just say reservations. If you are trying to reach an individual, just say their name. |
| User | report |
| (application recognizes "report" as being associated with a prerecorded audio fragment) | |
| System | One hundred inches of snow fell over night, resulting in fantastic ski and snow boarding conditions. All lifts are open, offering a variety of powder, packed powder, and machine groomed runs. The skies are sunny and the temperature is currently 28 degrees. |
| (dialog returns to main menu) | |
| System | To hear current ski conditions, say report. To arrange for lessons or talk to someone about equipment rentals, just say school. To plan a fantastic winter getaway, just say reservations. |
| User | reservations |
| (application transfers control to a speech application providing automated reservation services) | |

The following dialog illustrates the interaction between a user that is trying to reach someone that works for the Big Mogul Mountain ski resort:

| | |
|---|---|
| System | Hi, you've reached the Big Mogul Mountain luxury ski resort. |
| System | To hear current ski conditions, say report. To arrange for lessons or talk to someone about equipment rentals, just say school. To plan a fantastic winter getaway, just say reservations. If you are trying to reach an individual, just say their name. |
| User | John Doe |
| (call transferred to the telephone number associated with "John Doe") | |

Figure 25:
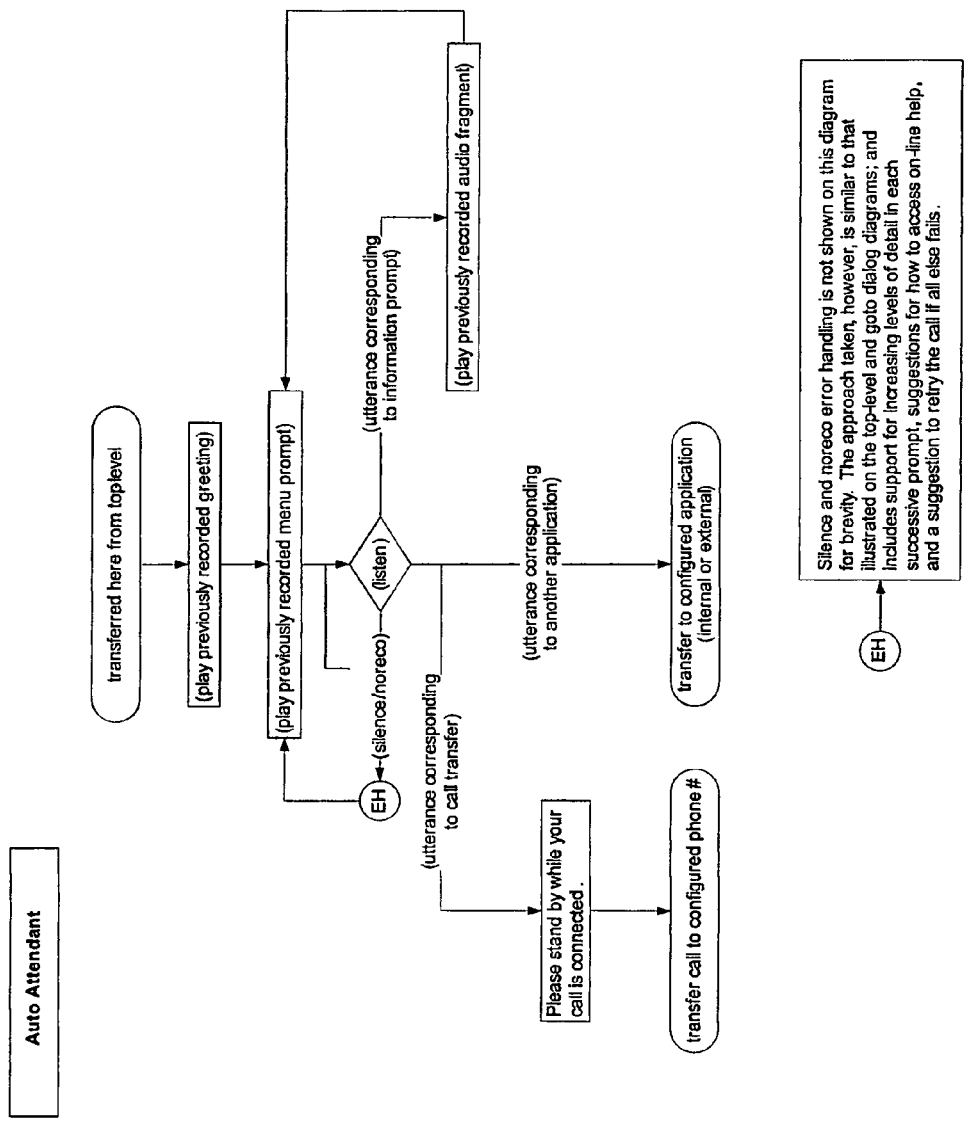
FIG. 25 is a diagram of an embodiment of the dialog flow for the conversational scenarios application.

An exemplary embodiment of the dialog flow for the conversational scenarios application is shown in FIG. 25. As was described above, the primary grammar used in this application is one that is completely customizable by CallWords customers. User-specifiable utterances are associated with either prerecorded audio fragments (for example, the daily ski report used in the sample conversation scenario above), a telephone number to transfer the call to, or the address of another speech application.

This application will use confidence scores to conditionally confirm user input using a specialized "corrective" confirmation grammar.

Multiple Routing Scenarios Capability

Figure 26:
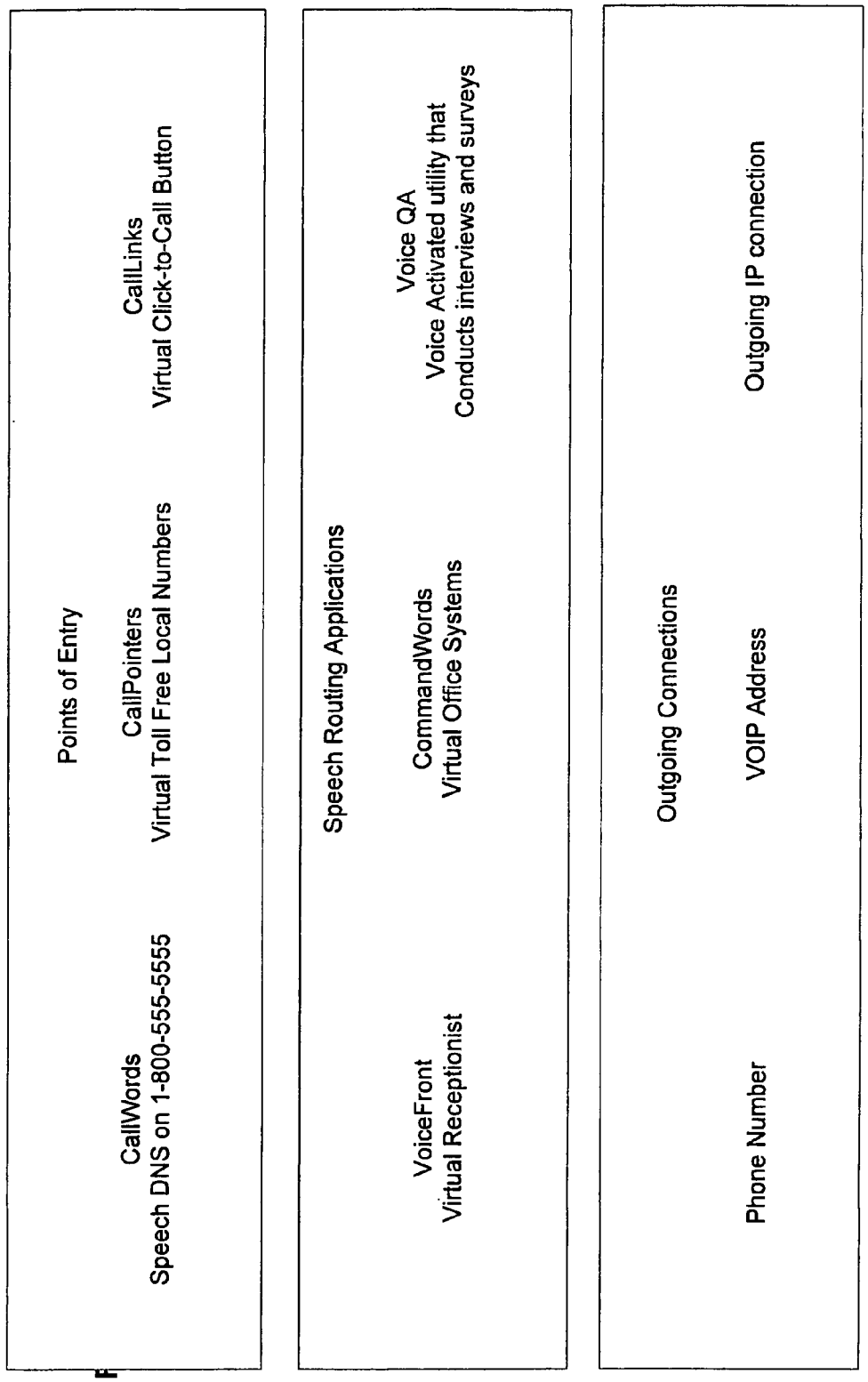
FIG. 26 is a diagram of an embodiment of a variety of voice web and other command line actions.

Voice Internet Speech Applications may be pointed to outbound call connections, to other speech applications, to our proprietary VoIP client or to a variety of voice web and other command line actions as shown in FIG. 26.

CommandWords Virtual In-Call Assistant

The CommandWords In-Call Assistant provides users with a variety of call functionality before, during and after a connected phone call is established whether on the web with a VoIP connection or on a phone or smart phone connection. It also provides a visual component and user controls when used with any device that offers display capabilities or an audio interface in a regular phone call.

What makes this application unique is its ability to connect and reconnect during a call so that all voice activated functions are available during the course of the entire connected session.

Figure 27:
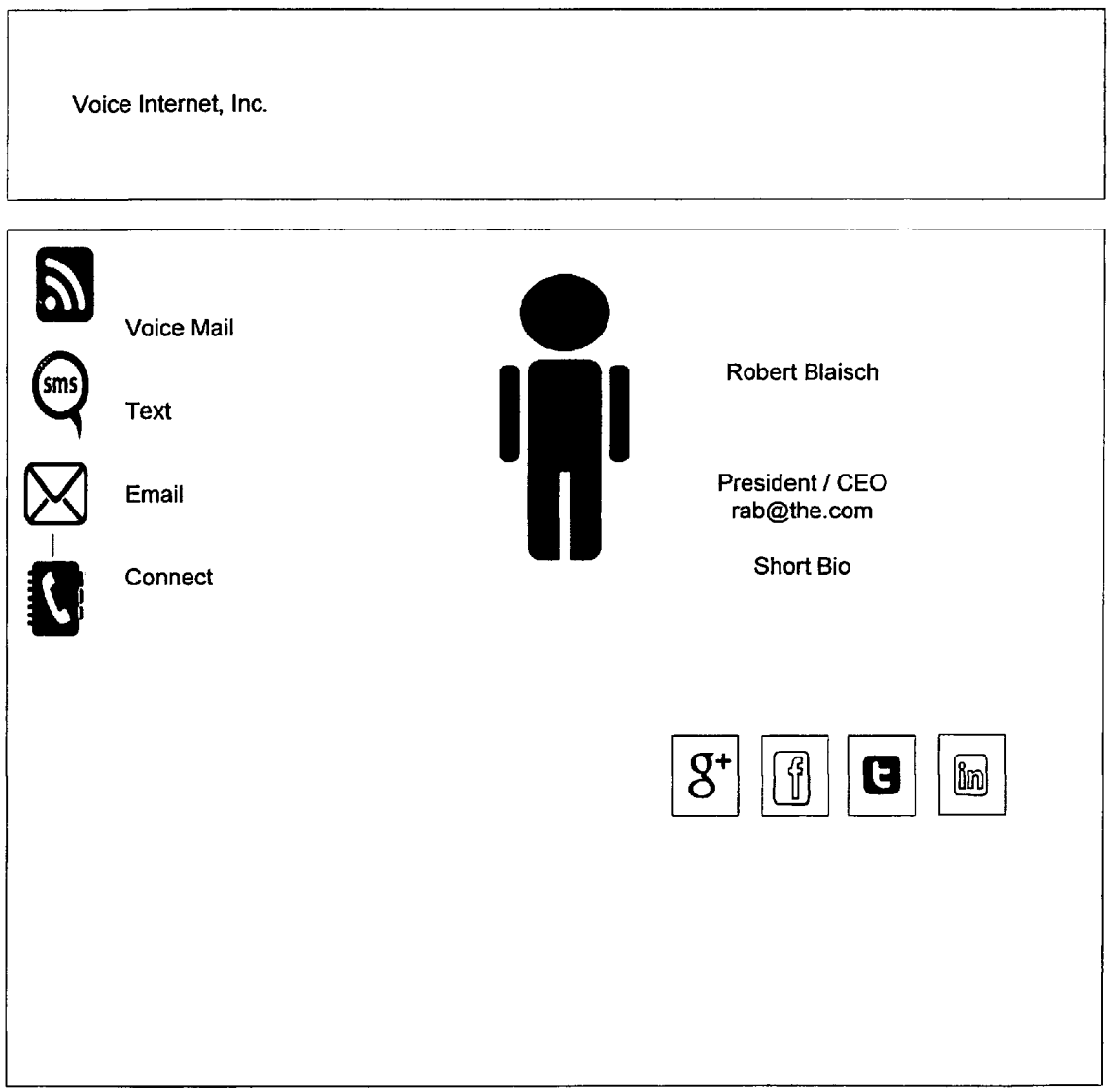
FIG. 27 is a diagram of an embodiment of a CommandWords Virtual in-call assistant.

Furthermore complete visual and voice activated controls are made available to the user during the sessions. These controls are also available with only voice activated technology during phone calls. An exemplary embodiment of CommandWords Virtual in-call assistant is shown in FIG. 27. The CommandWords offers the capabilities as shown in FIG. 28A and FIG. 28B.

Call Screening

This application provides traditional call screening services by Voice Internet's unique call switching infrastructure. After playing a greeting and recording a brief announcement from the caller (typically just their name), the application will place the incoming call on hold and then place an outbound call to the customer's configured telephone number. Depending on the outcome of this outbound telephone call, the incoming call might be disposed of in several ways.

If the outbound call fails (goes busy or is unanswered), the application will offer the caller the option of leaving a voice mail message. If the user agrees, control will transfer to the voice mail speech application described in the next section.

If the outbound call to the CallWords® customer succeeds, the application will play a prompt identifying itself and the incoming caller. The customer will then be asked how they would like to dispose of the call. The customer may respond in one of several ways:

By saying "I'll take it". This causes the application to drop the call to the customer and then transfer the incoming call to their phone.

By saying "take a message". This causes the application to transfer control to the voice mail speech application.

By saying "record reply". This causes the application to prompt the customer to start recording a message. When the customer has finished recording their message, the application will drop the outbound call to the customer, reconnect to the incoming call, and then play the recorded message back to the caller. The caller will be offered an opportunity to repeat the message as many times as they'd like before being transferred to voice mail or disconnecting the call.

By saying a previously configured utterance that maps to a prerecorded audio fragment. This option allows a Voice Internet customer to easily pick from a set of canned (and arbitrarily detailed) replies to be played back to the caller. For example, a customer might configure their account so that saying "I'll call back" causes the application to playback a piece of audio to the user that indicates the customer is unavailable right now, but will call them right back.

The following dialog illustrates the interaction of this application with both a caller and the CallWords customer they're trying to reach.

| | |
|---|---|
| System | Hello, this is the extension of (customer name). |
| System | Please announce yourself by saying your name now. |
| Caller | John Doe |
| (incoming call put on hold) | |
| (application dials customer number, call is answered) | |
| System | You have an incoming call from (John Doe). What would you like to do? |
| Customer | I'll call back |
| (customer call dropped, incoming call reconnected) | |
| (system plays back recording associated with the "I'll call back" utterance) | |
| System | Thanks for the call. I'm tied up right now with something I can't interrupt. If you don't need me to call you right back, just leave me a voice mail message or send me an email instead. Otherwise, I'll call you right back." |

Figure 29:
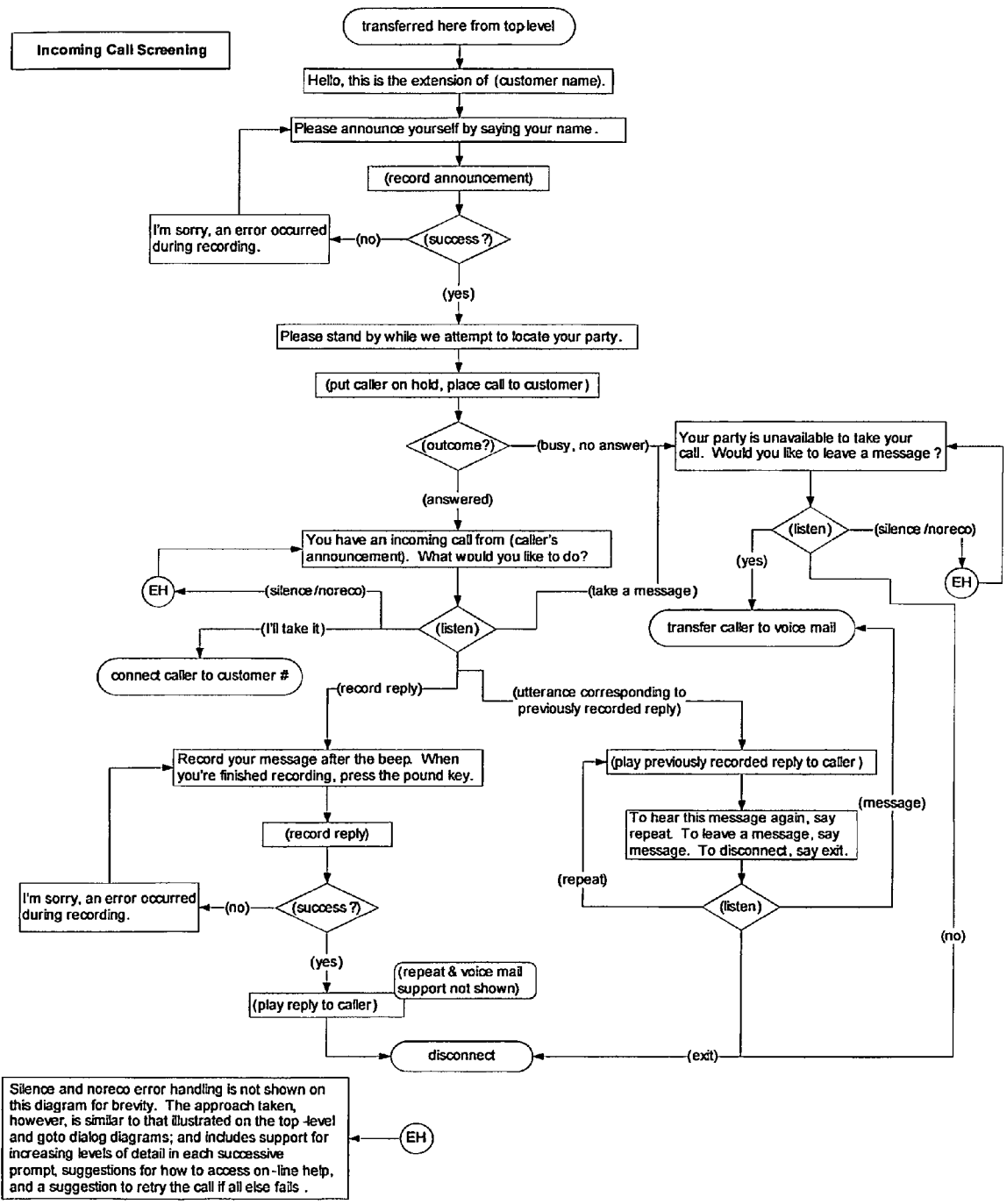
FIG. 29 is a diagram of an embodiment of the dialog flow for a call screening application.

FIG. 29 illustrates an exemplary embodiment of the dialog flow for the call screening application.

The grammars used in this application support both a caller's interaction with the system as well as the application's interaction with the customer who is screening calls.

Callers have minimal interaction with the system, basically restricted to recording their name (which is a raw recording, not a recognition event) and answering prompts to replay the customer's audio reply or transfer to voice mail.

The application's interaction with the customer who is screening calls, on the other hand, involves a completely customizable grammar managed by the customer. This grammar, as was described in the conversation introduction to this section above, is populated with a set of utterances dictated by the customer, and mapped onto either prerecorded audio fragments or a transfer to another speech application (e.g.: voice mail). This application will use confidence scores to conditionally confirm user input using a specialized "corrective" confirmation grammar.

The standard help and navigation commands as described in section 4.1.5 are supported in this application.

Voice Mail

This application, reachable from several other speech applications (the main portal, the domain directory service application, the auto attendant application, and the call screening application), provides standard outward-facing voice mail services. CallWords customers use the "Messages" application described in section 6.8 to retrieve voice mail messages and manage their voice mail inbox.

The following dialog illustrates a typical caller's interaction with the voice mail application:

| | |
|---|---|
| System | (play customer-recorded greeting) |
| System | Record your message after the beep. When you are finished recording, press the pound key. |
| User | Hi, Fred. This is Barney. I need to talk to you about that quarry reorganization. Please give me a call back when you get a chance. |
| User | (presses the # key) |
| System | Would you like to leave a callback number? |
| User | Yes |
| System | What is your phone number? |
| User | five five five one two three four |

-continued

| | |
|---|---|
| System | To send this message, say send. To hear the message you've just recorded, say review. To disconnect without leaving a message, say cancel. |
| User | send |
| (application saves message for later customer retrieval) | |
| (call dropped) | |

Figure 30:
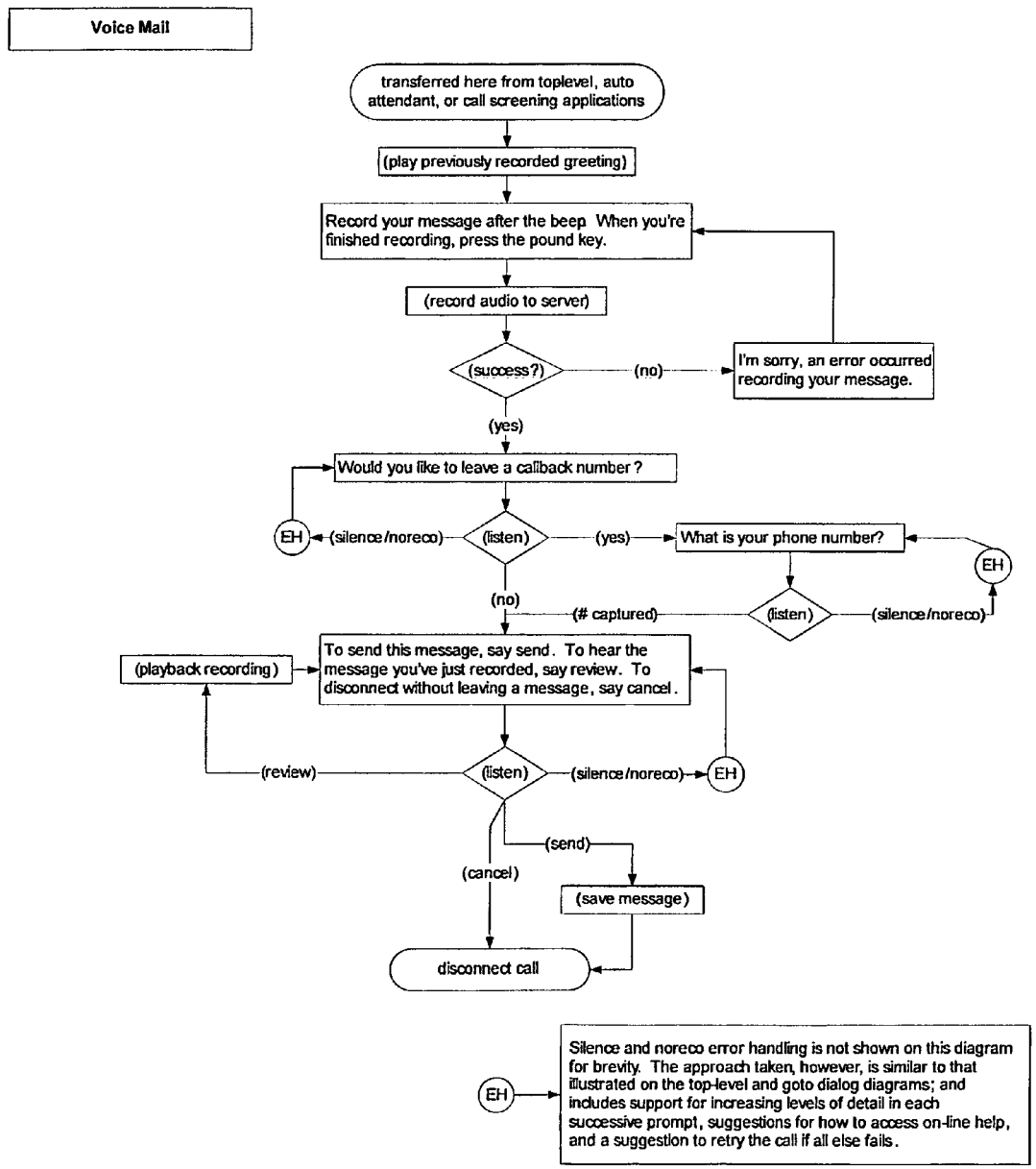
FIG. 30 is a diagram of an embodiment of the dialog flow supported by the voice mail application.

FIG. 30 illustrates an exemplary embodiment of the dialog flow supported by the voice mail application.

Aside from support for capturing the user's telephone number, the main grammar associated with this application is fairly straight forward, and represents the choice of utterances a caller can respond with after recording a message for the customer ("send", "review", and "cancel").

This application will use confidence scores to conditionally confirm user input using a specialized "corrective" confirmation grammar.

This application serves as a jumping off point for accessing all of the services provided by the personal assistant suite of applications.

The following dialog illustrates a customer's first access to the personal assistant during a phone call (which requires authentication) and their request to access their voice mail inbox.

| | |
|---|---|
| (an unauthenticated customer transfers here by using the "login" command) | |
| System | You've reached the personal assistant. |
| System | Please say your account number, or enter it on the touchtone keypad now. |
| User | one two three |
| System | Please say your pass phrase, or enter your PIN code on the touchtone keypad now. |
| System | (using DTMF for privacy:) 1 2 3 4 5 |
| (application authenticates customer) | |
| System | Hello (customer name). |
| System | What would you like to do next? |
| User | get messages |
| (application transfers control to the "messages" voice mail management application) | |

Figure 31:
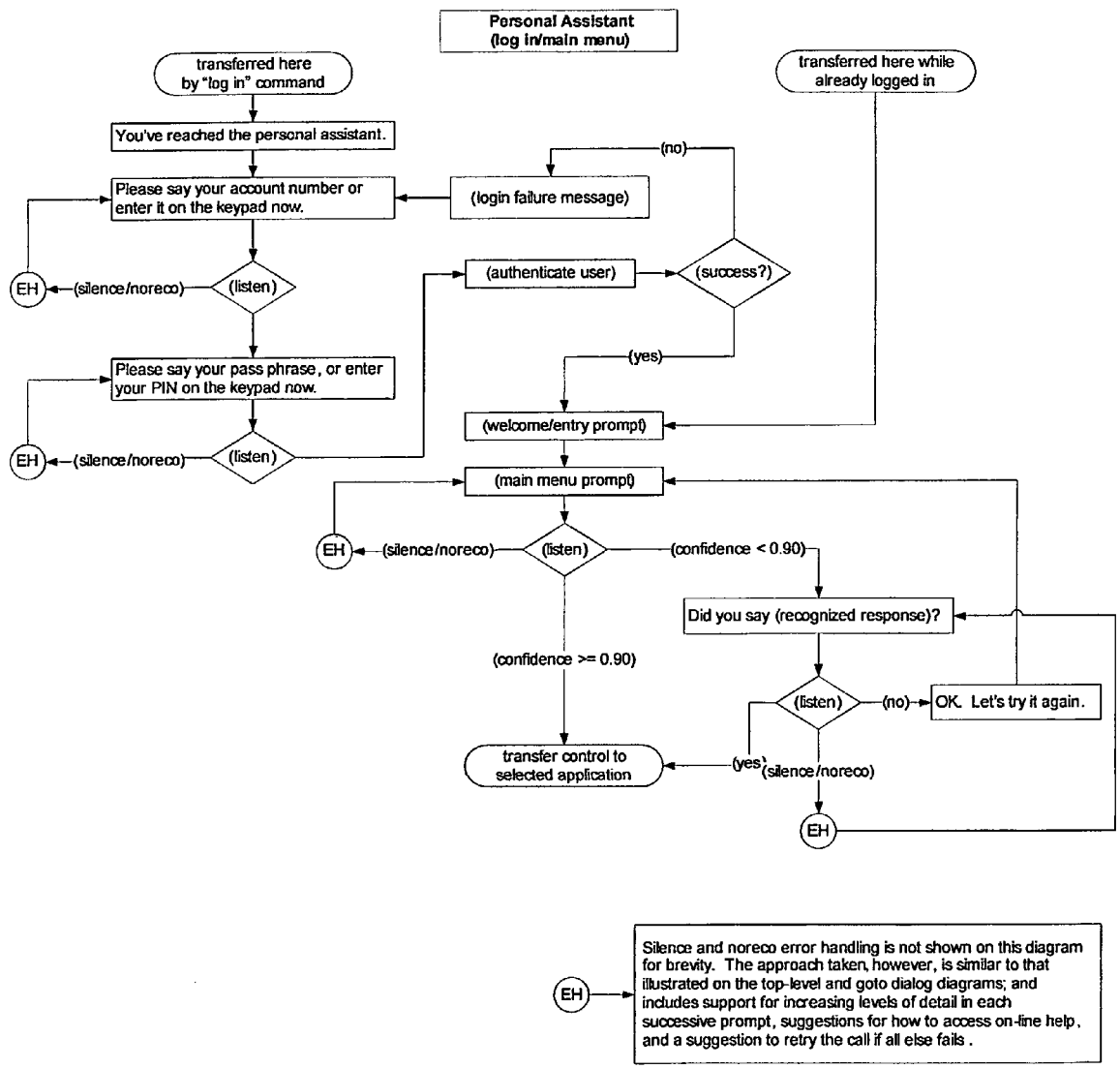
FIG. 31 is a diagram of an embodiment of the dialog flow for the personal assistant main menu application.

FIG. 31 illustrates an exemplary embodiment of the dialog flow for the personal assistant main menu application (including authentication support).

Figure 32:
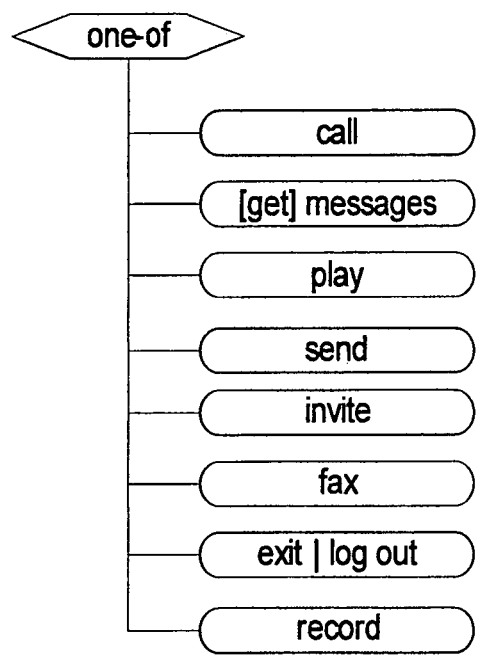
FIG. 32 is a diagram of an embodiment of a main menu prompt.

Aside from the grammars used to support authentication (login) and confirmation, the grammar associated with the main menu prompt may be displayed as shown in FIG. 32. Each recognized utterance causes control to transfer to a separate speech application making up the personal assistant suite of applications. This application will use confidence scores to conditionally confirm user input using a specialized "corrective" confirmation grammar.

Call

This application allows a customer to be transferred to a single telephone number listed in their contacts database. If a selected contact has more than one phone number registered (for example, home, work, or mobile), the application allows the customer to select which one to use.

The following dialog illustrates a typical user/application interaction:

| | |
|---|---|
| System | Who would you like to call? |
| User | John Doe |
| (application retrieves contact information; selected contact has multiple phone numbers) | |

-continued

| | |
|---|---|
| System | Multiple phone numbers are listed for John Doe. Please choose one of the following options: work, home, mobile. |
| User | work |
| (application transfers call to selected phone number) | |

Figure 33:
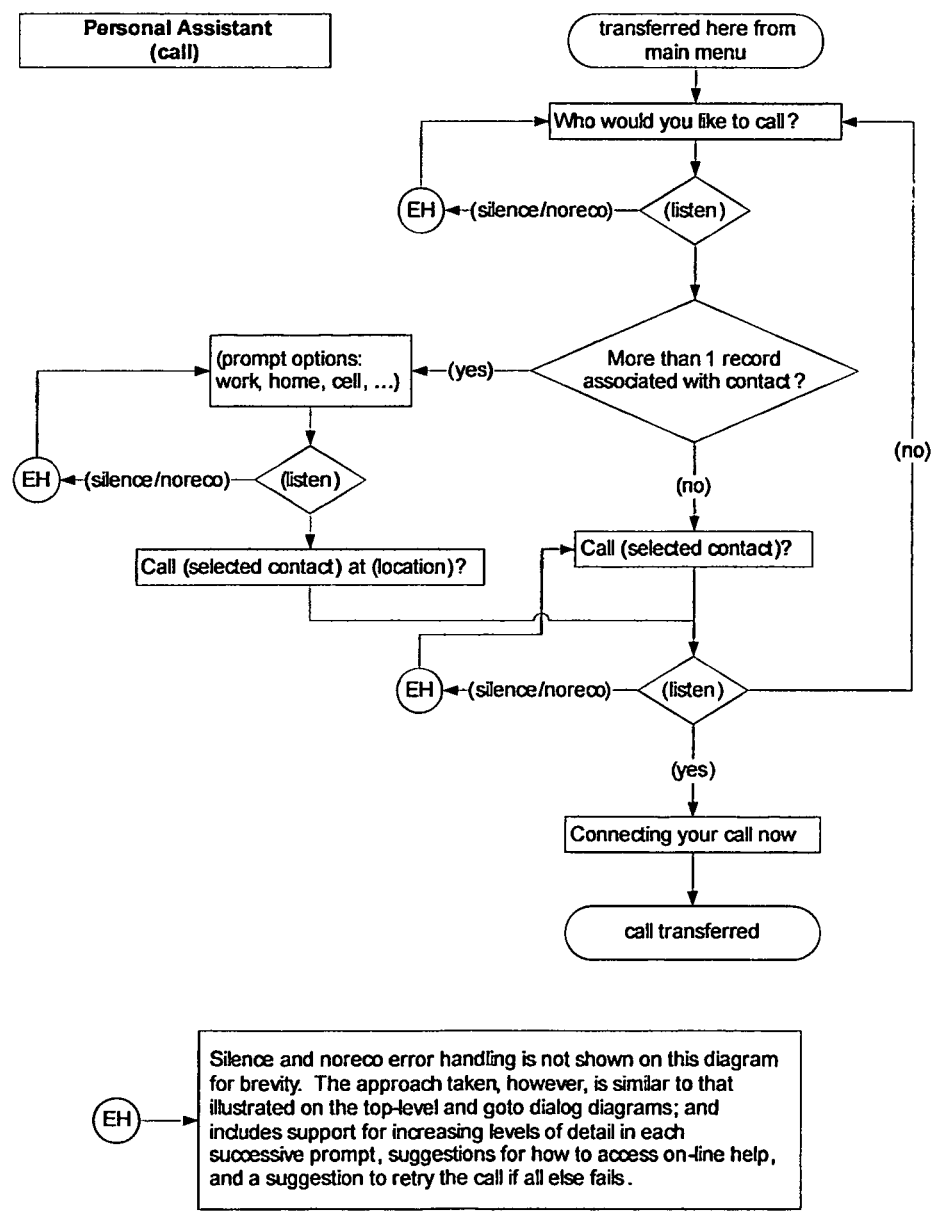
FIG. 33 is a diagram of an embodiment of the dialog flow for the Call application.

FIG. 33 illustrates an exemplary embodiment of the dialog flow for the Call application.

The primary grammar associated with this application is one that is dynamically composed to allow the customer to select a contact from their contacts database. For selected contacts that have multiple phone number entries registered, a secondary dynamic grammar is used to allow the customer to indicate which phone number to dial. This application will use confidence scores to conditionally confirm user input using a specialized "corrective" confirmation grammar.

Send

This application allows a customer to select a previously uploaded file to email to someone in their contacts database.

The operation itself is handled by a different backend system. A repeated failure to email the requested file to the specified contact will result in an email notice of the error condition being sent to the customer.

The following dialog illustrates how a customer might interact with this application in order to email a previously uploaded Word document that has been associated with an utterance of "resume" to an individual listed in the customer's contacts database.

| | |
|---|---|
| System | Which file? |
| User | resume |
| System | Who do you want to send this to? |
| User | John Doe |
| System | Send resume to John Doe? |
| User | Yes |
| (application queues request to backend system to email requested file to selected contact) | |
| (application transfers control back to the personal assistant main menu) | |

Figure 34:
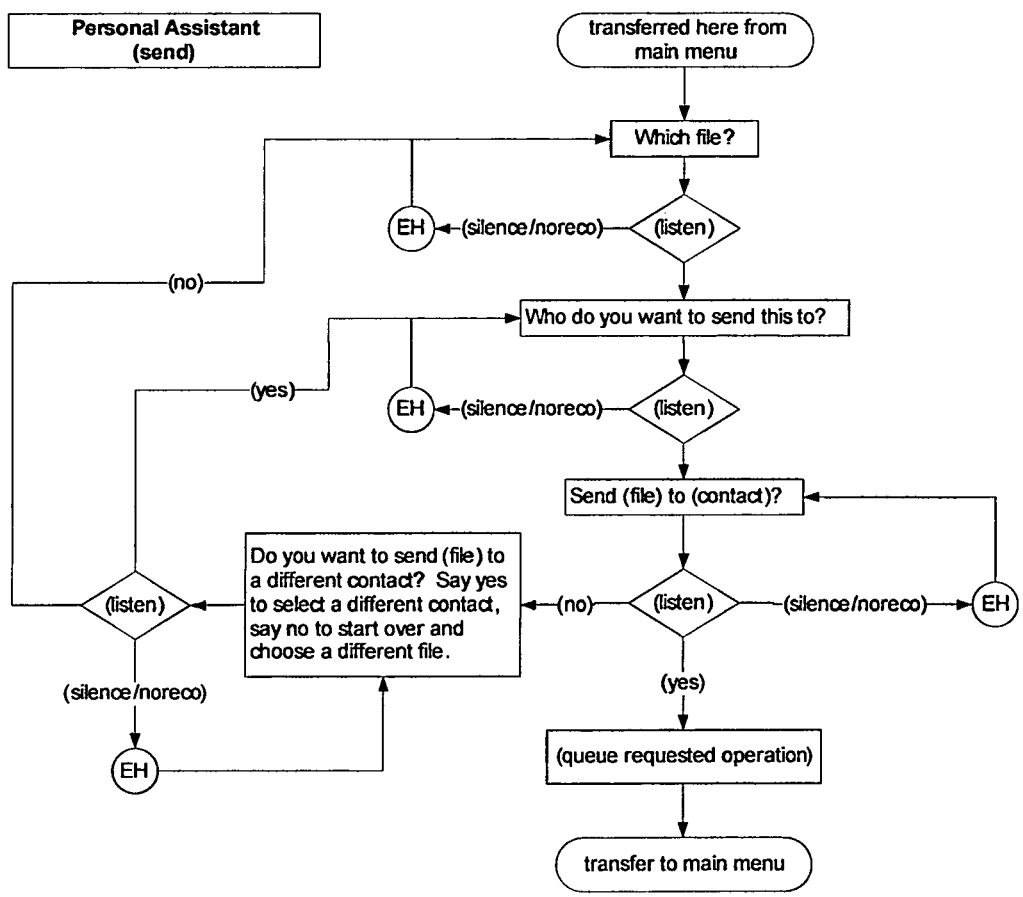
FIG. 34 is a diagram of an embodiment of the dialog flow for the Send application.

FIG. 34 illustrates an examplary embodiment of the dialog flow for the Send application.

The grammars associated with this dialog allow a customer to select a previously uploaded file (by saying a preconfigured utterance) to then select someone from their contact list indicating who the file should be emailed to. This application uses a single explicit confirmation step to confirm both the file and contact selection. If a recognition error has been made while gathering either or both of these pieces of information, the application asks the user if they need to correct the file selection or contact selection before resuming.

Fax

The "fax" service of the personal assistant is actually identical in nature to the "send" application in terms of dialog flow, grammars, and commands. In fact, the same application code base is used. The differences between the fax and send applications are either cosmetic (slightly different word choices in the confirmation prompts) or the selection of the actual operation that is performed once the dialog completes.

For example, when the send application has gathered the required information (file and contact) from the caller and posted this information back to the speech web application, it queues a request to our backend system to send an email. The fax service performs the same sequence of operations, except that when the information is posted back to the speech web application, the request is sent to a different backend system that handles outbound fax operations.

Like the send application, a repeated failure to fax the requested file to the specified contact will result in an email notice of the error condition being sent to the customer Invite & Push This is actually a pair of applications designed to work together (one leading to the other) to provide a mechanism for a CallWords customer that is talking to someone on the telephone to use speech commands to invite the person they're talking with to join a "web push" session that allows the CallWords customer to use voice commands to influence what their contact sees in a browser.

When activated, the invite application asks the customer who they'd like to invite to join a "web push" session. Once a contact has been selected, the application sends an email to the selected contact containing an "invitation". The invitation message contains a link (embedded with context information) to a web page running on a Voice Internet server. This web page, which includes an embedded client-side object, serves as a "portal" back to the contact's browser through which the CallWords customer can "push" content.

Once the CallWords customer has sent the invitation using this application, and a session established, control will transfer to the "push" application. The push application allows the CallWords customer to use speech commands ("push") to cause selected content to be displayed in the browser of the person they're talking to over the phone. The content might be pushed "by reference" (i.e., sending just a URL), causing the contact's browser to display a different web page; or the content might be pushed "by value" (for example, pushing a photo or other document to the browser). Other commands ("next", "previous", etc) can also be used to control slideshow presentations that are pushed.

The following dialog illustrates the interaction between a sales person that is a CallWords customer and a prospective client that the sales person is trying to close a deal with.

| | |
|---|---|
| (sales person dials 800-555-5555 and logs into their personal assistant and calls John Doe at work) | |
| (application transfers call to selected phone number; application no longer involved in the call right now) | |
| John | Acme corp. This is John. |
| Bob | Hi John, Bob here. Do you have a few minutes to go over my proposal? |
| John | Sure |
| Bob | Great. I'm going to send you an email inviting you to join a session so I can show you a few things. When you get it, just click the link it gives you. Hang on a second while I send out the invitation. |
| Bob | (presses ## on his keypad or a button in his web interface or mobile app) |
| (personal assistant applications comes back online, already knows the customer is authenticated) | |
| System | Hello Bob. What would you like to do next? |
| Bob | Invite |
| (main menu application transfers control to the invite application) | |
| System | Who would you like to invite? |
| Bob | John Doe |
| (application emails invitation to John Doe) | |
| John | Okay - I got the invitation. |
| (John clicks link, launching his browser and entering web push session with Bob) | |
| (invite application transfers control to the push application) | |
| System | What would you like to push? |
| Bob | widget presentation |
| (push application sends the specified web presentation to John's browser) | |
| System | Your content was pushed |
| (push application remains on the call with Bob & John) | |
| Bob | Do you see the presentation? |
| John | Yes |

| | |
|---|---|
| Bob | Great. On this slide, you can see . . . |
| (Bob uses "next", "previous", other speech commands to control presentation) | |
| Bob | . . . and there you have it. Before we go, I'd like to show you one more thing to consider before making your decision. |
| John | Sure |
| Bob | push |
| System | What would you like to push? |
| Bob | widget specs |
| (application pushes URL to product specification web page to John's browser) | |
| System | Your content was pushed |
| Bob | This page will give you all of the details about our product that I didn't cover in the presentation. If you bookmark this page and take a few minutes to review it when you have a few minutes, I think you'll see we have the best product available on the market. |
| John | Sounds good - I'll do that. Talk to you soon. |
| Bob | Thanks again for your time, John. Bye. |

Figure 35:
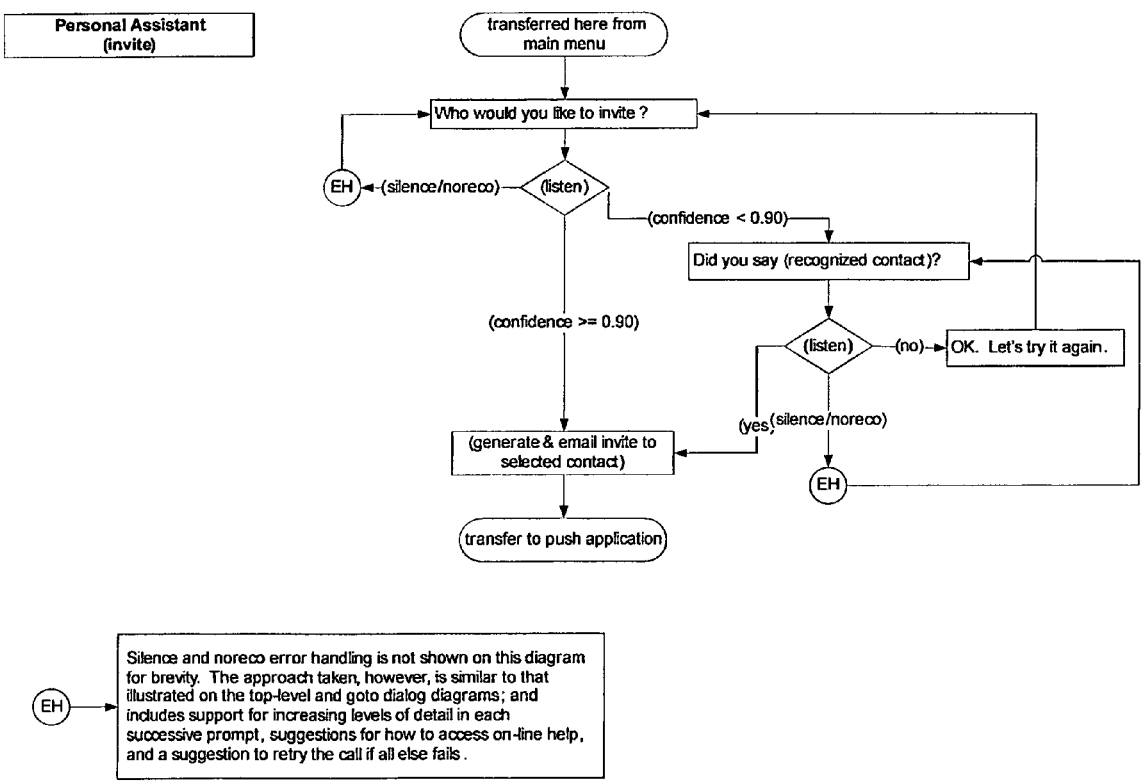
FIG. 35 is a diagram of an embodiment of the dialog flow for the invite applications.
Figure 36:
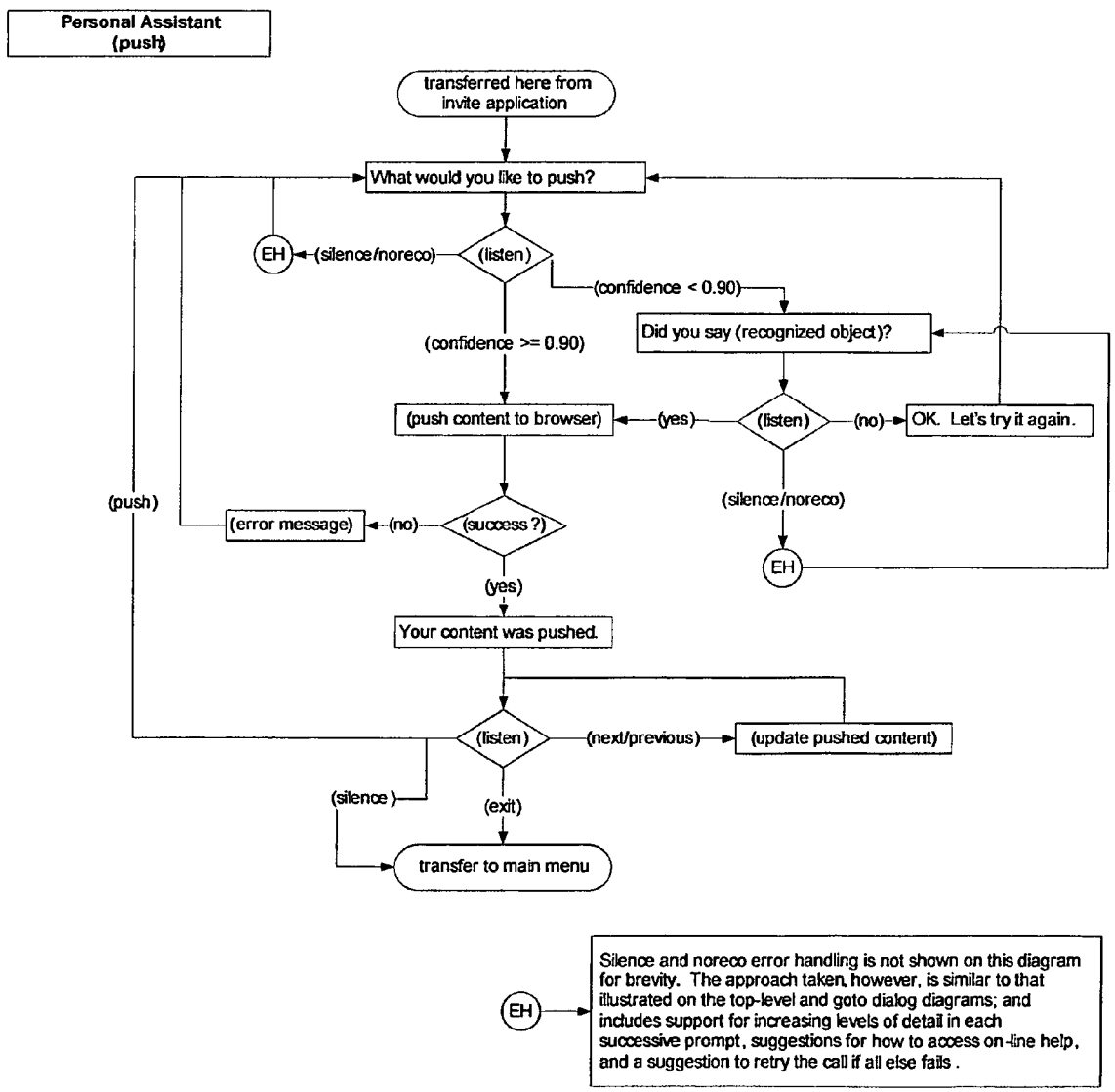
FIG. 36 is a diagram of an embodiment of the dialog flow for the push applications.

FIG. 35 and FIG. 36 illustrates an exemplary embodiment of the dialog flow for the invite and push applications, respectively.

The primary grammar for the invite application is the same one (dynamically composed) that's used in other personal assistant applications for selecting a contact from the CallWord customer's contact database.

The first grammar used for the push application is one that recognizes a list of customer-configured "CallWords" that each correspond to a previously uploaded file (or URL). This allows the customer to use a simple one or two word utterance to indicate a piece of content to push to the person that's joined the session. Once the initial piece of content has been sent to the contact's browser, a different QA will be used to allow the customer to provide presentation navigation commands ("next", "previous", etc), select a new piece of content to push ("push"), or exit back to the main menu of the personal assistant. This application will use confidence scores to conditionally confirm user input using a specialized "corrective" confirmation grammar.

Record

The record application allows a customer to use their telephone to record arbitrary audio messages that can be associated with "CallWords". Once associated with an utterance, this content can then used in a variety of ways:

It can be played into an active phone call by using ## to bridge the personal assistant back into a call and subsequently using the "play" command to select the content to audio to play into the call.

It can be referred to from the call screening application and therefore used as a prerecorded reply to someone whose call you can't or don't want to take at the moment.

It can be made available in the auto attendant application, and therefore accessed by callers (e.g.: a daily ski report).

At the time a recording is made, a temporary CallWord is assigned so that the recording is available via the "play" command immediately (perhaps for playback later in the same call). However, when the recorded audio is captured, the application also sends a confirmation email to the CallWords customer. This email contains a link to an online web application that can be used by the customer to assign a more meaningful CallWord to this recording (as well as indicate which recordings should be made available from the "play", auto attendant, and call screening applications).

The following dialog illustrates CallWords customer (a Widget sales person named Bob) and a happy client of his (John Doe) to whom he sold a product recently:

| | |
|---|---|
| (Bob has called 800-555-5555, logged into his personal assistant, and called John Doe) | |
| (no speech application is connected to the call at this time) | |
| Bob | Now that you've had a chance to use our Widgets, what do you think? |
| John | It's the most amazing thing I've ever seen. I wish we'd bought it 5 years ago. |
| Bob | That's great. Would you be willing to give me a brief testimonial? |
| John | Absolutely. |
| Bob | Fantastic. Please say what you want at the beep. |
| Bob | (press ## on his keypad) |
| (personal assistant applications comes back online, already knows Bob is authenticated) | |
| System | Hello Bob. What would you like to do next? |
| Bob | Record |
| (control transfers to the record application) | |
| System | Recording started. |
| System | (beep) |
| John | Hi, this is John Doe, president of WizBiz Systems. We recently bought our first Widget from Acme Corp and, as a result, have already saved over five million dollars. I can't speak highly enough of the Widget product itself, or Acme Corp's fantastic customer service. |
| John | (presses the # key) |
| System | Recording stopped. |
| (application sends email to Bob) | |
| System | Would you like to record another message? |
| Bob | No |
| Bob | Thanks again, John. I appreciate you putting in a good word for us. |
| John | My pleasure. |

Figure 37:
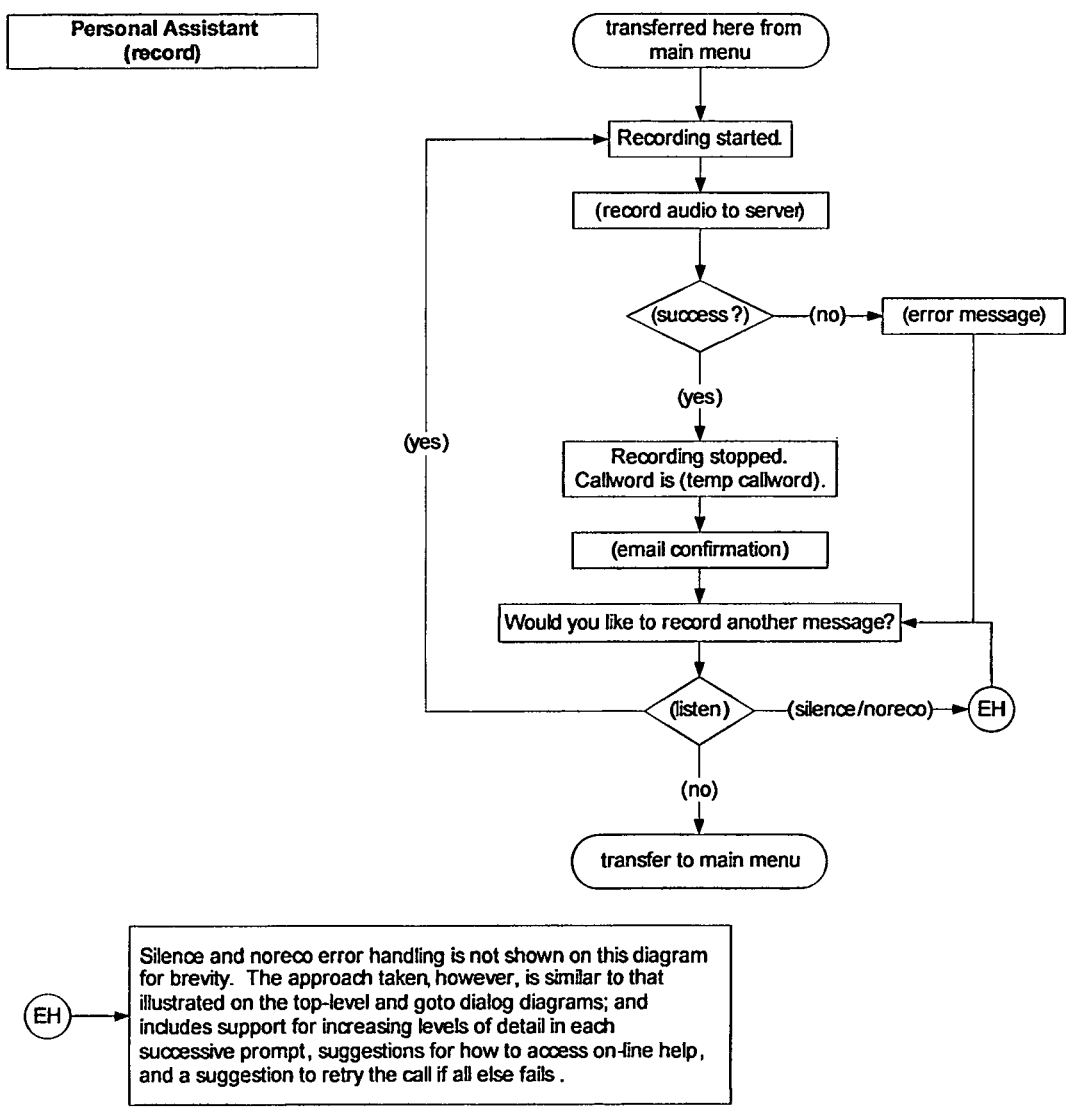
FIG. 37 is a diagram of an embodiment of the dialog flow for the Record application.

FIG. 37 illustrates an exemplary embodiment of the dialog flow for the Record application. The only grammar needed by this application is the standard yes/no grammar, which is used in conjunction with asking the user if they'd like to record another message. Audio messages are recorded using the RecordSound control. The user's yes/no response will be confirmed explicitly only if the recognizer reports a confidence score of less than 0.90.

Play

This application allows a Call Words customer to play previously recorded audio messages into an active phone.

The following dialog illustrates how a CallWords customer (a Widget salesman named Bob), who has used 800-555-555 and the personal assistant's "call" feature to call a potential client (Mary):

| | |
|---|---|
| (Bob has called 800-555-5555, logged into his personal assistant, and called Mary) | |
| (no speech application is connected to the call at this time) | |
| Bob | Have you had a chance to review the information I sent you about our product? |
| Mary | Yes I have. |
| Bob | Great. Do you have any questions? |
| Mary | Yes. The product details you provided were very complete, but I'd like to know what other customers of yours have thought about your product. Can you provide me with any references? |
| Bob | Absolutely. I'll email you a complete list today. You'll find them all to be very happy with our product and service. In fact, would you like to hear a brief testimonial from one of our more recent customers? |

-continued

| | |
|---|---|
| Mary | Sure |
| Bob | Great - just a second please. |
| Bob | (presses ## on his keypad) or clicks a control on his computer or mobile device |
| (personal assistant applications comes back online, already knows Bob is authenticated) | |
| System | Hello Bob. What would you like to do next? |
| Bob | Play |
| (control transfers to the play application) | |
| System | What do you want to play? |
| Bob | widget testimonial |
| (application looks up recording associated with "widget testimonial" CallWord, plays audio into the call) | |
| System | Hi, this is John Doe, president of WizBiz Systems. We recently bought our first Widget from Acme Corp and, as a result, have already saved over five million dollars. I can't speak highly enough of the Widget product itself, or Acme Corp's fantastic customer service. |
| System | Do you want to play something else? |
| Bob | No |
| Mary | Wow - five million dollars in savings already. That's impressive . . . |

Figure 38:
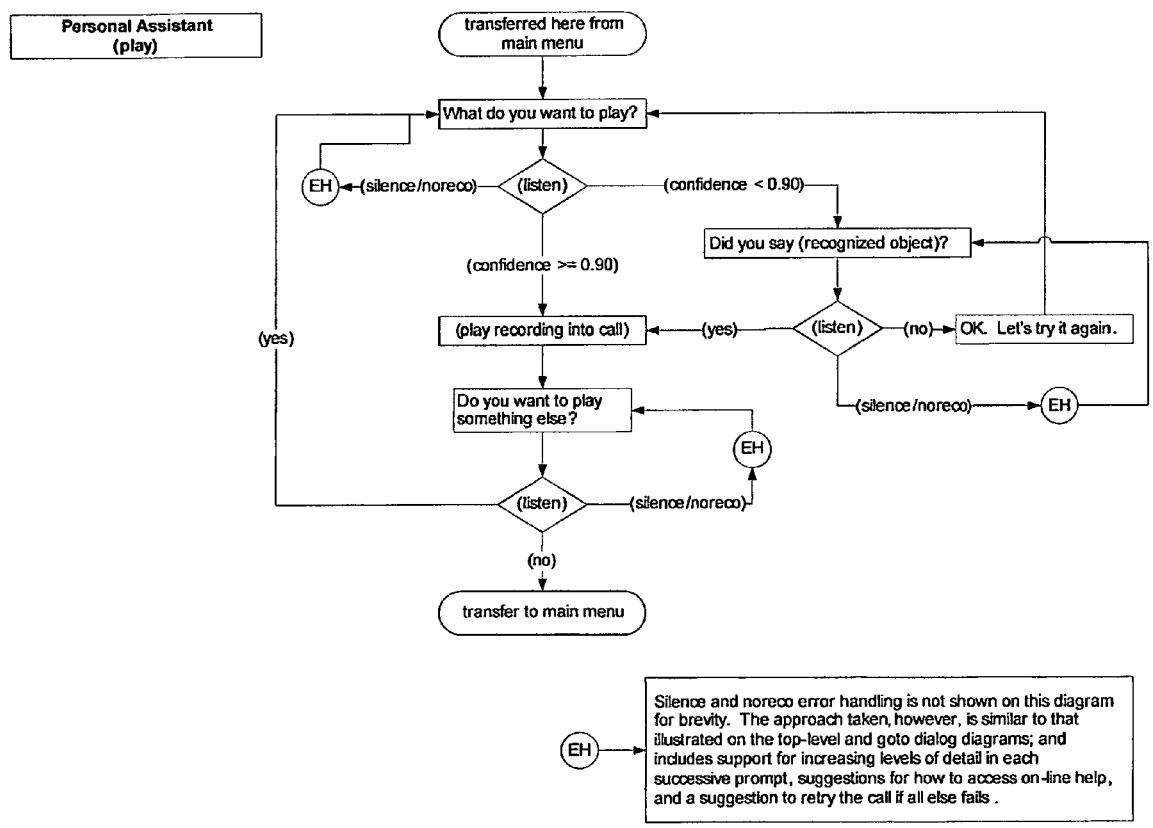
FIG. 38 is a diagram of an embodiment of the dialog flow for the Play application.

FIG. 38 illustrates an exemplary embodiment of the dialog flow for the Play application. Aside from confirmations, the primary grammar associated with this application is one that's dynamically composed to allow the user to say the name of a previously configured "CallWord" that corresponds to an audio recording they wish to play into a call. This application will use confidence scores to conditionally confirm user input using a specialized "corrective" confirmation grammar.

Messages

This application provides classic support for retrieving messages that have been left for the customer using the voice mail speech application that is described in section 5.3.

The following dialog illustrates a simple user/system interaction:

| | |
|---|---|
| (control transferred here from personal assistant main menu) | |
| System | You have 2 new messages and no saved messages. |
| (application skips prompting user to choose between new and saved messages because it knows there are no saved messages at this time) | |
| System | Message received Thursday at 1:38 P.M. |
| System | (plays first message) |
| System | Next command? |
| User | Save |
| (application marks first message for save, advances to second message) | |
| System | Message received Friday at 9:04 A.M. |
| System | (plays second voice mail message) |
| System | Next command? |
| User | Delete |
| System | Delete this message? |
| User | Yes |
| (application marks second message for deletion) | |
| System | Next command? |
| User | Exit |
| (application deletes/saves messages) | |
| (application transfers control back to the personal assistant main menu) | |

Figure 39:
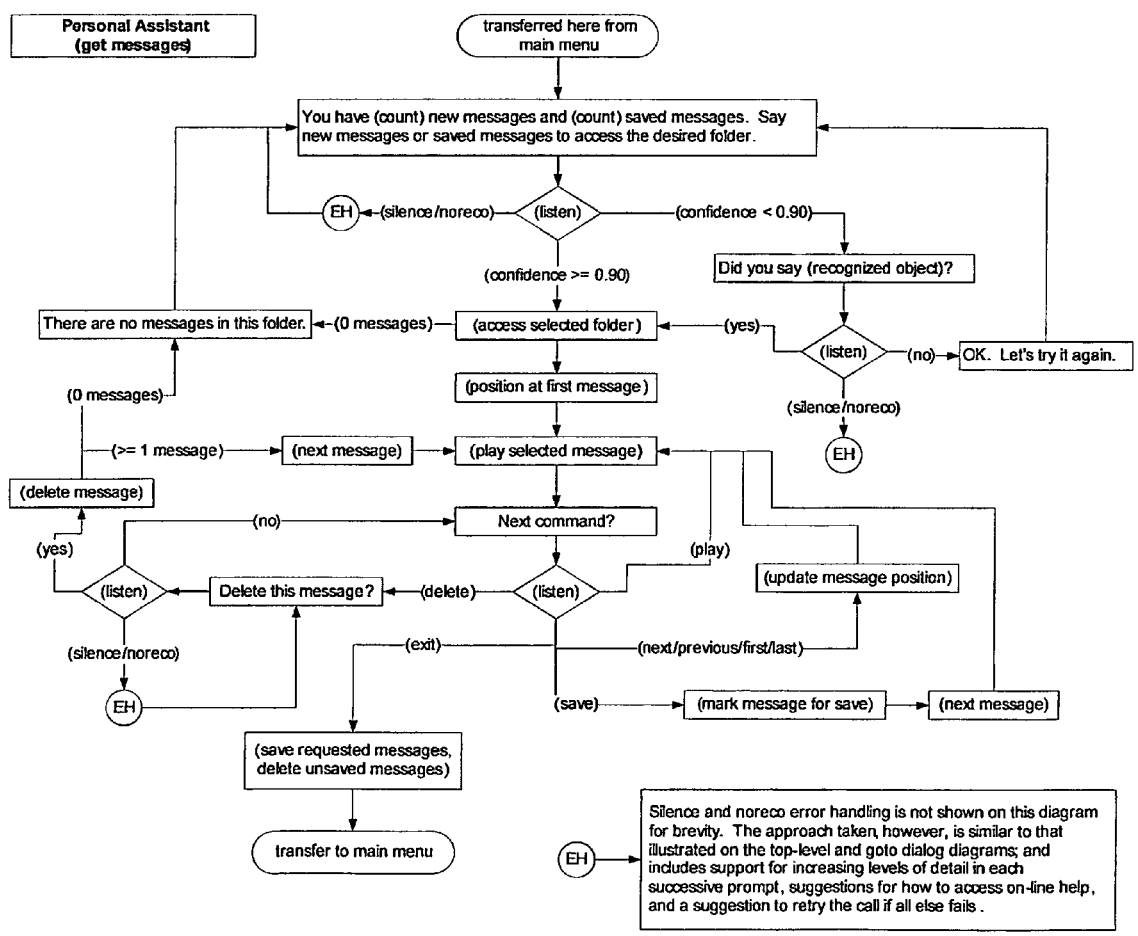
FIG. 39 is a diagram of an embodiment of the complete dialog flow for the Messages application.

FIG. 39 illustrates exemplary embodiment of the complete dialog flow for the Messages application. The DataTableNavigator control will be used to support navigation of new or saved messages. Commands, as described below, will be used to support the "save" and "delete" operations.

This application will use confidence scores to conditionally confirm user input using a specialized "corrective" confirmation grammar.

In addition to the standard help and navigation commands, the following command utterances will also be supported:

save—marks the current voice mail message so that it is not deleted.
delete—marks the current voice mail message for deletion.
exit—exits the message retrieval application and transfers control to the main menu of the personal assistant.

Edge Network/Passive Resource Memory Channel

A significant challenge in speech technology is the cost of deploying applications. During the course of interacting with an application, the user exclusively uses a one to one ratio of voice channels and speech ports. Furthermore one or more long distance channels are also in use during the call. CallWords has developed a solution for this problem by developing a technology which allows calls to be received by a local or VoIP switch, and then establish an active bridge to a centrally located resource center to perform the speech recognition function. At the completion of the speech session, the resource center is dropped, out of band signaling data is passed back to the original via TCP/IP, and the original local switch completes the call. A passive resource connection is maintained during the call, enabling the caller to bridge back to the originating speech resource at any time by simply pressing ** or ## on a phone or on a control in a speech application or in a Voice Control Panel on the web. This process significantly reduces the cost of speech application deployment and at the same time enables an in-call speech media resource SOSO (Speech On/Speech Off)

This technology is provided to alter the state of the user experience to allow for conversation during playback without barging into the speech recognizer. The state of the "listening" will change as the dialogue progresses to allow normal conversation to occur while interacting with the system. The listening technology will only be enabled during specific segments of the program.

Customizable Wake-Up Words with a Customizable Reply Prompt.

When a user configures their account they will be able to choose one or more wake up words that the speech recognizer will listen for; all other words it hears will be discarded until it is "woken up." Upon hearing the "wake up" word, the system will respond with the user created response to the wake up word. For example, the user may say, "Hey, computer," and the response may be, "I'm here, John." The user can choose to configure both the grammar and also load in the appropriate multimedia audio file. This may be done with video resources as well.

Speech API

TVI Speech Application Programming Interface (SAPI) consists of programming code that can be embedded into any HTML scripting environment to enable a third-party Website with this API implemented to support TVI's suite of speech-activated controls.

What is claimed is:

1. A method for directing an internet browsing session comprising:

activating a first web page by a user,
establishing an audio overlay control channel comprising a voice over internet protocol (VoIP) channel;
rendering a user interaction control layer, the user interaction control layer comprising a graphical overlay displayed over the first page and including a plurality of user-selectable options;
rendering, by the user interaction control layer, a first host audio-visual content item associated with the first active web page, and wherein the plurality of user-selectable options are associated with the first host audio-visual content item;

caching a plurality of second audio-visual content items, each of the cached plurality of second audio-visual content items associated with a corresponding user-selectable option from the plurality of user-selectable options related to the first web page;

receiving, via the audio overlay control channel, a selection of a user-selectable option from the plurality of user-selectable options;

activating a second web page by a user based on the selection of the user-selectable option in the user interaction control layer; and rendering a selected second host audio-visual content item, wherein the selected second host audio-visual content item is the cached second audio-visual content item associated with the selected user-selectable option.

2. The method of claim 1 wherein the activating is a user click of an icon or menu item.

3. The method of claim 1 wherein the activating is a recognized speech utterance.

4. The method of claim 1 wherein the audio overlay control channel is further comprised of a set of host generated speech utterances.

5. The method of claim 1 wherein a second user interaction control layer is rendered on the second web page.

6. The method of claim 5 wherein the second user interaction control layer is a graphic overlay displayed on the second web page and comprises a second plurality of user-selectable options which may be selected by the user.

7. The method of claim 6 wherein the second plurality of user-selectable options are based on the selected second host audio-visual content item.

8. The method of claim 1, wherein the step of activating the second web page further comprises:

activating the second web page by a recognized speech utterance from a plurality of speech utterances, wherein the plurality of recognized speech utterances is based on the plurality of user-selectable options.

9. The method of claim 1 wherein the plurality of user-selectable options specifies a plurality of navigation options, wherein each of the plurality of navigation options is linked to a plurality of second web pages.

10. The method of claim 1, further comprising mapping the plurality of recognized speech utterances to the execution of specific actions associated with the user-selectable options.

11. The method of claim 1, further comprising:

tracking the activation of the second web page based on the selection of the user-selectable option; and billing an advertiser associated with the second web page based on the activation of the second web page and the content of the first host audio-visual content item.

12. The method of claim 1, further comprising:

receiving, via the user interaction control layer, a user request for a telephone connection;

retrieving a telephone number associated with the user from a database; and placing a call, by the audio overlay control channel, to the telephone number to initiate a telephone call with the user.

\* \* \* \* \*